US010044450B2

(12) United States Patent
Furuichi et al.

(10) Patent No.: US 10,044,450 B2
(45) Date of Patent: Aug. 7, 2018

(54) COMMUNICATION CONTROL DEVICE, COMMUNICATION CONTROL METHOD AND INFORMATION PROCESSING APPARATUS

(71) Applicant: SONY CORPORATION, Tokyo (JP)

(72) Inventors: Sho Furuichi, Tokyo (JP); Ryo Sawai, Tokyo (JP); Ryota Kimura, Tokyo (JP); Hiromasa Uchiyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 310 days.

(21) Appl. No.: 14/769,904

(22) PCT Filed: Mar. 11, 2014

(86) PCT No.: PCT/JP2014/056343
§ 371 (c)(1),
(2) Date: Aug. 24, 2015

(87) PCT Pub. No.: WO2014/181580
PCT Pub. Date: Nov. 13, 2014

(65) Prior Publication Data
US 2016/0006522 A1  Jan. 7, 2016

(30) Foreign Application Priority Data
May 8, 2013  (JP) .................................. 2013-098247

(51) Int. Cl.
*H04W 52/24* (2009.01)
*H04B 15/00* (2006.01)
(Continued)

(52) U.S. Cl.
CPC ............ *H04B 15/00* (2013.01); *H04W 16/14* (2013.01); *H04W 72/0453* (2013.01);
(Continued)

(58) Field of Classification Search
CPC . H04W 16/14; H04W 72/0453; H04W 72/08; H04W 17/345; H04W 72/121; H04W 84/045
See application file for complete search history.

(56) References Cited

U.S. PATENT DOCUMENTS 8,369,862 B2 * 2/2013 Kim ...................... H04W 16/10
455/452.1
8,787,907 B2 * 7/2014 Jain ....................... H04W 16/14
370/328
(Continued)

FOREIGN PATENT DOCUMENTS

JP  2010-74471 A   4/2010
JP  2012-134650 A  7/2012
(Continued)

OTHER PUBLICATIONS

Extended European Search Report dated Nov. 22, 2016 in Patent Application No. 14794951.5.
(Continued)

*Primary Examiner* — Maharishi V Khirodhar
(74) *Attorney, Agent, or Firm* — Oblon, McClelland, Maier & Neustadt, L.L.P.

(57) ABSTRACT

A communication control device that acquires first interference information indicating a first interference from communication involving a communication node that is not controlled by the communication control device and second interference information indicating a second interference from communication involving another communication node that is controlled by the communication control device. The communication control device classifies the communication nodes into groups related to a decision of a radio resource that is available for use by a communication node based on the first interference information and the second interference information.

18 Claims, 18 Drawing Sheets

(51) Int. Cl.
*H04W 16/14* (2009.01)
*H04W 72/04* (2009.01)
*H04W 72/08* (2009.01)
H04B 17/345 (2015.01)
H04W 84/04 (2009.01)
H04W 72/12 (2009.01)

(52) U.S. Cl.
CPC .......... *H04W 72/08* (2013.01); *H04B 17/345* (2015.01); *H04W 72/121* (2013.01); *H04W 84/045* (2013.01)

(56) References Cited

U.S. PATENT DOCUMENTS

| | | | | |
|---|---|---|---|---|
| 2007/0291702 | A1* | 12/2007 | Nanba | H04J 3/00 370/336 |
| 2008/0009244 | A1* | 1/2008 | Lee | H04W 72/1231 455/69 |
| 2009/0186621 | A1* | 7/2009 | Umeda | H04L 1/0003 455/446 |
| 2009/0190541 | A1 | 7/2009 | Abedi | |
| 2010/0075704 | A1 | 3/2010 | Mchenry et al. | |
| 2010/0279700 | A1* | 11/2010 | Kim | H04W 16/10 455/452.1 |
| 2012/0044815 | A1* | 2/2012 | Geirhofer | H04W 72/082 370/248 |
| 2012/0094681 | A1 | 4/2012 | Freda et al. | |
| 2013/0051358 | A1* | 2/2013 | Turtinen | H04W 74/0816 370/330 |
| 2013/0242932 | A1 | 9/2013 | Tiirola et al. | |
| 2013/0344913 | A1 | 12/2013 | Li et al. | |
| 2014/0044000 | A1 | 2/2014 | Charbit et al. | |
| 2014/0092835 | A1* | 4/2014 | Athley | H04W 24/02 370/329 |
| 2014/0112179 | A1 | 4/2014 | Muraoka | |
| 2014/0135049 | A1* | 5/2014 | Hirata | H04W 28/16 455/501 |
| 2016/0269133 | A1 | 9/2016 | Charbit et al. | |

FOREIGN PATENT DOCUMENTS

| | | |
|---|---|---|
| JP | 2013-55446 A | 3/2013 |
| WO | WO 2010/022156 A2 | 2/2010 |
| WO | WO 2011/127447 A1 | 10/2011 |
| WO | WO 2012/069081 A1 | 5/2012 |
| WO | WO 2012/139301 A1 | 10/2012 |
| WO | WO 2012/169400 A1 | 12/2012 |
| WO | WO 2013/037137 A1 | 3/2013 |

OTHER PUBLICATIONS

Search Report and Written Opinion dated Oct. 26, 2016 in Singaporean Patent Application No. 11201508962W.

Tuncer Baykas, et al., "Developing a Standard for TV White Space Coexistence: Technical Challenges and Solution Approaches" IEEE Wireless Communications, Invited Article, vol. 19, No. 1, XP011442636, Feb. 2012, pp. 10-22.

Xuemin Hong, et al., "Cognitive Radio Networks" IEEE Vehicular Technology Magazine, vol. 4, No. 4, XP011285049, Dec. 2009, pp. 76-84.

International Search Report dated Jun. 3, 2014 in PCT/JP2014/056343 (with partial English language translation).

Office Action dated Nov. 14, 2017 in Japanese Application No. 2015-515806, 7 pages.

Naotaka Sato, Sony Corp., TV White Spaces as Part of the Future Spectrum Landscape for Wireless Communications, ETSI Workshop on Reconfigurable Radio Systems, 13 pages docbox.etsi.org/Workshop/2012/201212_RRS/PRESENTATIONS.

3GPP TSG-RAN WG1 Meeting #61, Montreal Canada, May 10-14, 2010, R1-103155, Downlink ICIC in Heterogeneous Networks [online], TD Tech, 7 pages.

Naotaka Sato et al., Sony Corp., TV White Spaces as Part of the Future Spectrum Landscape for Wireless Communication, ETSI Reconfigurable Radio Systems Workshop, Dec. 12, 2012, Cannes, France <URL:https://docbox.etsi.org/ Workshop/2012/201212_RRS/PAPERS, 10 pages.

ETSI TR 102 907 v1.2.1 (Nov. 2012)—Reconfigurable Radio Systems (RRS); Use Cases for Operation in White Space Frequency Bands—Details of 'RTR/RRS-01015 Work Item'—Work Program 23 pages.

* cited by examiner

COMMUNICATION CONTROL DEVICE, COMMUNICATION CONTROL METHOD AND INFORMATION PROCESSING APPARATUS

CROSS-REFERENCE TO RELATED APPLICATIONS

This application is a National Stage of International. Application No. PCT/JP2014/056343, filed Mar. 11, 2014, which claims priority to Japanese Application No. 2013-098247, filed May 8, 2013; the entire contents of which are incorporated herein by reference.

TECHNICAL FIELD

The present disclosure relates to a communication control device, a communication control method, and an information processing apparatus.

BACKGROUND ART

In recent years, the wireless communication environment is confronting a problem of depletion of frequency resources, due to rapid increase of data traffic. Thus, there is a study of secondarily utilizing frequency channels. As one example, there is a study of secondarily utilizing what is called "television white space (TVWS)" with respect to television broadcasting. Also, as another example, there is a study for allowing a base station of small cell to utilize a frequency channel for a base station of macro cell in HetNet (Heterogeneous Network).

Several methods are conceived as a method in which a communication node, such as a master white space device (WSD) that secondarily utilizes a TVWS and a base station of small cell, utilizes a frequency channel. For example, as a first method, it is conceived to utilize a vacant channel that is not utilized. Also, as a second method, it is conceived to protect a main user of a primary system (for example, a television broadcast system), a base station of macro cell, and the like by some sort of means, and to utilize an adequate frequency channel in the entire frequency channels including the utilized frequency channel.

As one example of the above first method, for example, Patent Literature 1 discloses a technology in which the channel of TVWS is selected for each time period on the basis of channel vacancy information for each time period corresponding to position information, and wireless communication is performed on the basis of the selected channel of TVWS.

CITATION LIST

Patent Literature

Patent Literature 1: JP 2012-134650A

SUMMARY OF INVENTION

Technical Problem

However, the technology disclosed in Patent Literature 1 is an example of the above first method, and therefore the utilized frequency channel is limited to a vacant channel that is not utilized by a main user (a primary system, a base station of macro cell, etc.). Hence, the communication capacity of a communication node (a master WSD, a base station of small cell, etc.) that utilizes a frequency channel can become smaller. Also, if a communication node (a master WSD, a base station of small cell, etc.) tries to utilize a frequency channel utilized by the main user, the interference due to the utilization of the main user, which is not a control target, can occur in the above communication node. Hence, the communication quality of the communication node can decrease.

Also, the technology disclosed in Patent Literature 1 does not consider an interference between a plurality of communication nodes (a plurality of master WSDs, a plurality of base stations of small cell, etc.) that utilize a frequency channel. Hence, the communication quality of the plurality of communication nodes can decrease, in an environment in which an interference between the plurality of communication nodes can occur. In consideration of the interference between the plurality of communication nodes, it is conceived to solve an optimization problem of a combination of the plurality of communication nodes and a plurality of frequency channel candidates, for example. However, this is what is called a NP-hard problem, and its solution is not calculated uniquely. Hence, full search for combinations of a plurality of communication nodes and a plurality of frequency channel candidates is forced to be performed. The number of the combinations increases in an exponential fashion according to the number of the communication nodes and the number of the frequency channel candidates, and therefore the calculation amount can become enormous.

Thus, it is desirable to provide a scheme that improves the communication of a communication node that utilizes a radio resource (frequency channel) under an environment in which there is an interference from communication involving a communication node that is not control target, with less calculation amount.

Solution to Problem

According to the present disclosure, there is provided a communication control device including: an acquisition unit configured to acquire first interference information indicating a first interference from communication involving a communication node that is not control target and second interference information indicating a second interference from communication involving another communication node of control target, with respect to each of a plurality of communication nodes of control target; and a classifying unit configured to classify the plurality of communication nodes into a plurality of groups related to a decision of a radio resource that a communication node is able to utilize, on the basis of the first interference information and the second interference information with respect to the plurality of communication nodes.

According to the present disclosure, there is provided a communication control method including: acquiring first interference information indicating a first interference from communication involving a communication node that is not control target and second interference information indicating a second interference from communication involving another communication node of control target, with respect to each of a plurality of communication nodes of control target; and classifying the plurality of communication nodes into a plurality of groups related to a decision of a radio resource that a communication node is able to utilize, on the basis of the first interference information and the second interference information with respect to the plurality of communication nodes.

According to the present disclosure, there is provided an information processing apparatus including: a memory that stores a predetermined program; and a processor configured to execute the predetermined program. The predetermined program is a program for executing acquiring first interference information indicating a first interference from communication involving a communication node that is not control target and second interference information indicating a second interference from communication involving another communication node of control target, with respect to each of a plurality of communication nodes of control target, and classifying the plurality of communication nodes into a plurality of groups related to a decision of a radio resource that a communication node is able to utilize, on the basis of the first interference information and the second interference information with respect to the plurality of communication nodes.

Advantageous Effects of Invention

As described above, the present disclosure improves communication of a communication node that utilizes a radio resource (frequency channel) under an environment in which there is an interference from communication involving a communication node that is not control target, with less calculation amount.

DESCRIPTION OF EMBODIMENTS

Hereinafter, (a) preferred embodiment(s) of the present disclosure will be described in detail with reference to the appended drawings. Note that, in this specification and the drawings, elements that have substantially the same function and structure are denoted with the same reference signs, and repeated explanation is omitted.

Figure 1:
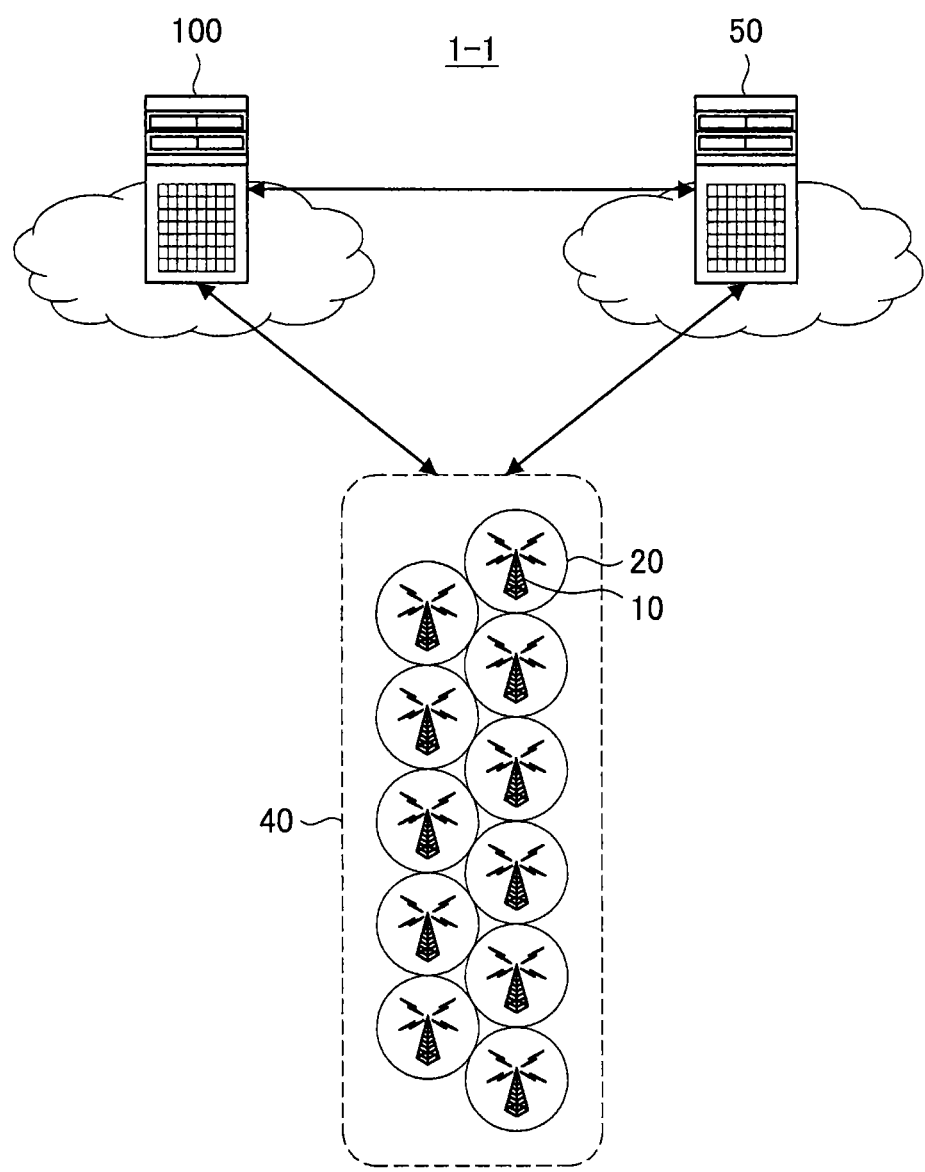
FIG. 1 is an explanatory diagram illustrating an example of a schematic configuration of a communication system according to an embodiment of a present disclosure.

Note that description will be made in the following order.
1. Configuration of Communication System
2. First Embodiment
　2.1. Function and Configuration of Communication Control Device
　2.2. Flow of Process
　2.3. First Exemplary Variant
　2.4. Second Exemplary Variant
　2.5. Third Exemplary Variant
3. Second Embodiment
　3.1. Overview
　3.2. Function and Configuration of Communication Control Device
　3.3. Flow of Process
4. Application Example
5. Specific Example of Communication Control Device
6. Conclusion 1. Schematic Configuration of Communication System First, with reference to FIGS. 1 to 6, the schematic configuration of a communication system 1 according to an embodiment of the present disclosure will be described. FIG. 1 is an explanatory diagram illustrating an example of the schematic configuration of the communication system 1 according to the embodiment of the present disclosure. Referring to FIG. 1, the communication system 1 includes a master WSD 10, a database (hereinafter, referred to as "DB") 50, and a communication control device 100. As described above, the communication system 1 according to the present embodiment is a secondary system that secondarily utilizes a TVWS, for example.

(Master WSD 10)

The master WSD 10 is a communication node of the secondary system (the communication system 1) that secondarily utilizes a frequency channel for a primary system (a television broadcast system). That is, the master WSD 10 communicates wirelessly by secondarily utilizing the frequency channel for the primary system (the television broadcast system).

For example, the master WSD 10 plays a role as an access point, and a slave WSD 30 accesses the master WSD 10. Then, the master WSD 10 communicates wirelessly with the slave WSD 30. In the following, a specific example will be described with reference to FIG. 2 with respect to this point.

Figure 2:
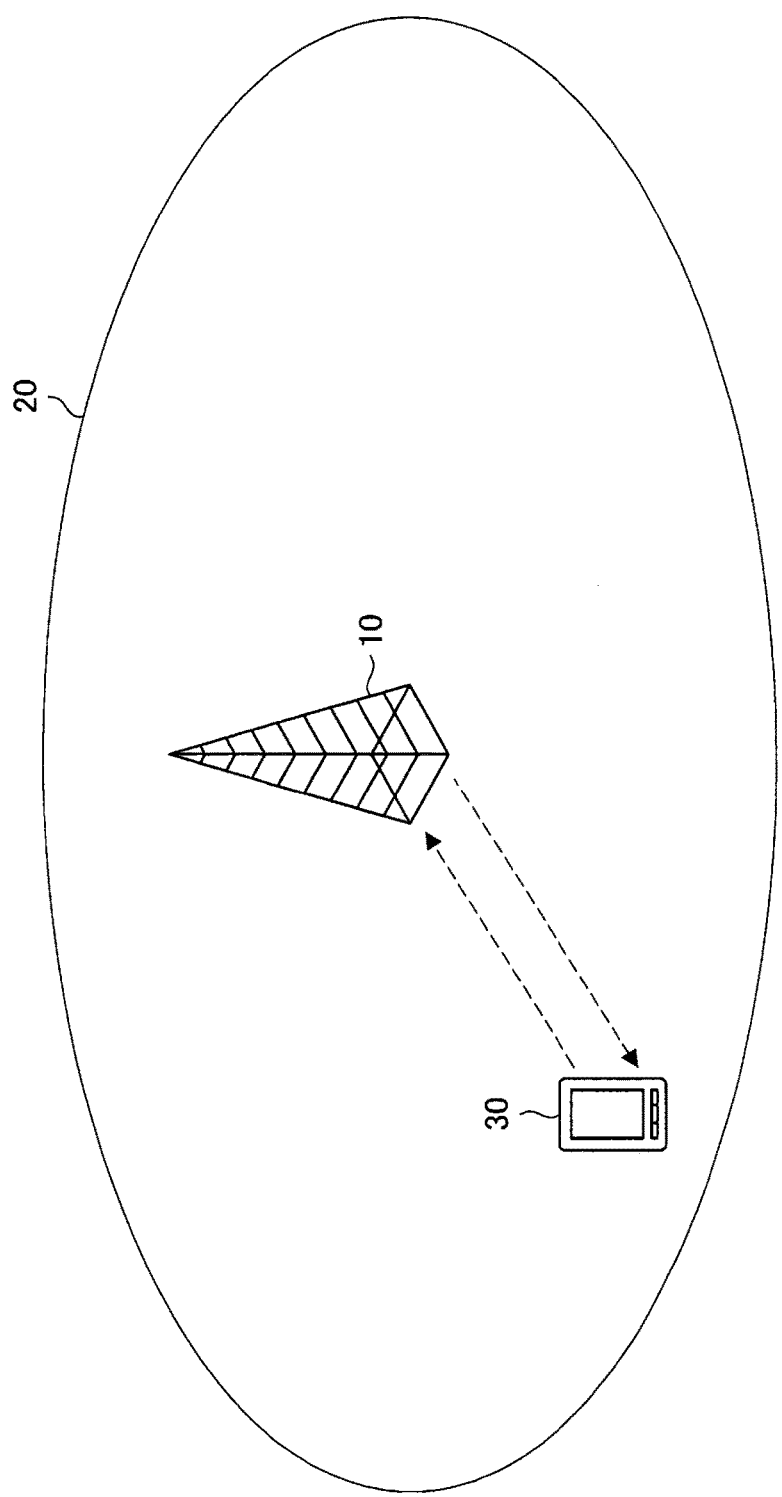
FIG. 2 is an explanatory diagram for describing an example of wireless communication by a master WSD.

FIG. 2 is an explanatory diagram for describing an example of wireless communication by the master WSD 10. Referring to FIG. 2, the master WSD 10 and a communication range 20 of the master WSD 10 are illustrated. When the slave WSD 30 is positioned in the communication range 20, the master WSD 10 communicates wirelessly with the slave WSD 30. Here, the master WSD 10 communicates wirelessly by secondarily utilizing the frequency channel for the primary system. An example illustrated in FIG. 2 is an example in which the master WSD 10 communicates wirelessly with one slave WSD 30, and the master WSD 10 can communicate wirelessly with a plurality of slave WSDs 30.

Also, for example, one or more master WSDs 10 form a set 40 of the master WSDs 10. The set 40 is a set of the master WSDs 10 that can affect each other, for example.

Also, for example, the master WSD 10 may employ time division duplex (TDD) or may employ frequency division duplex (FDD), as a duplex method. That is, the master WSD 10 communicates wirelessly by TDD or FDD.

Also, for example, allocation of the frequency channel to each slave WSD 30 is performed by the master WSD 10 or the communication control device 100. Specifically, for example, when TDD is employed, the master WSD 10 may allocate a frequency channel to each slave WSD 30 and notify each slave WSD 30 of the allocated frequency channel. Also, for example, when FDD is employed, the communication control device 100 may allocate a frequency channel to each slave WSD 30, and each slave WSD 30 may be notified of the allocated frequency channel via the master WSD 10.

Note that the frequency channel that each master WSD 10 is able to utilize is decided by the communication control device 100, for example.

Also, the master WSD 10 is connected to the DB 50 and/or the communication control device 100 via a wired or wireless backhaul line, for example.

(DB 50)

The DB 50 collects and retains various information. For example, the DB 50 collects and retains various types of information for deciding a utilizable frequency channel with respect to each master WSD 10. For example, the DB 50 collects various types of information from the master WSDs 10, the communication control device 100, a regulatory database (hereinafter, referred to as "regulatory DB"), and/or other communication nodes. The above regulatory DB is a DB included in a regulation institution of a country or an area, for example.

—Information Relevant to Primary System

For example, the DB 50 collects information relevant to the primary system (the television broadcast system). More specifically, for example, the information relevant to the primary system includes information (for example, number, position, height of antenna, transmission electric power) relevant to the communication node (the transmitter station) of the primary system. Also, the information relevant to the primary system includes information (number of channels, channel band width, center frequency, permissible maximum transmission electric power of each channel, transmit spectrum mask, etc.) relevant to the frequency channels for the primary system. Also, the information relevant to the primary system includes information relevant to a secondarily utilizable channel among the frequency channels for the primary system, for example. For example, the utilizable channel includes a vacant channel that is not utilized. Also, for example, the utilizable channel includes a utilized channel that is secondarily utilizable with prerequisite protection of the primary system.

Note that the DB 50 may collect information indicating an interference from communication involving the communication node of the primary system, with respect to each master WSD 10, as the above information relevant to the primary system. The interference may be an interference that is actually observed, or may be an interference calculated as a theoretical value from path-loss and the like.

Also, for example, the DB 50 collects information relevant to the primary system in a region under control of the DB 50, as the above information relevant to the primary system.

Note that the DB 50 may also collect information relevant to the primary system in another region adjacent to the region under control of the DB 50, as the above information relevant to the primary system.

Also, for example, the DB 50 collects the above information relevant to the primary system from the regulatory DB.

—Information Relevant to Secondary System

Also, for example, the DB 50 collects information relevant to the secondary system. More specifically, for example, information (for example, number, position, height of antenna, transmission electric power) relevant to the master WSD 10 of the secondary system is included.

Note that the DB 50 may also collect information indicating an interference from communication involving another master WSD 10, with respect to each master WSD 10, as the above information relevant to the secondary system. The interference may be an interference that is actually observed, or may be an interference calculated in advance as a theoretical value from path-loss and the like.

Also, for example, the DB 50 collects information relevant to the secondary system in a region under control of the DB 50, as the above information relevant to the secondary system.

Note that the DB 50 may also collect information relevant to the secondary system in another region adjacent to the region under control of the DB 50, as the above information relevant to the secondary system.

Also, for example, the DB 50 collects or in advance retains the above information relevant to the secondary system from the master WSD.

—Others

Also, for example, the DB 50 acquires parameters necessary for referring to an interference electric power. The parameters include an adjacent channel leakage ratio (ACLR), an adjacent channel selectivity (ACS), a shadowing margin, a fading margin, and/or a protection ratio (PR), for example.

Also, the DB 50 may collect the information of a position of a boundary line between a region under control of the DB 50 and another region adjacent to this region.

As described above, the DB 50 collects and saves various information. Note that, when the primary system and the secondary system continuously exist from the past, and the DB 50 already retains the information relevant to these primary system and secondary system, the DB 50 may utilize the information that is retained already. Also, the DB 50 may collect and update the information, when the information that is retained already is changed.

(Communication Control Device 100)

The communication control device 100 executes various processes relevant to control of the master WSD 10. For example, the processes include a process relevant to decision of a utilizable frequency channel with respect to each master WSD 10.

For example, the communication control device 100 decides the utilizable frequency channel with respect to each master WSD 10 of control target. Here, the communication control device 100 considers a first interference from communication involving the communication node that is not control target (for example, the communication node of the primary system), and a second interference from communication involving another master WSD 10 of control target.

(Flow of Information in Communication System)

Figure 3:
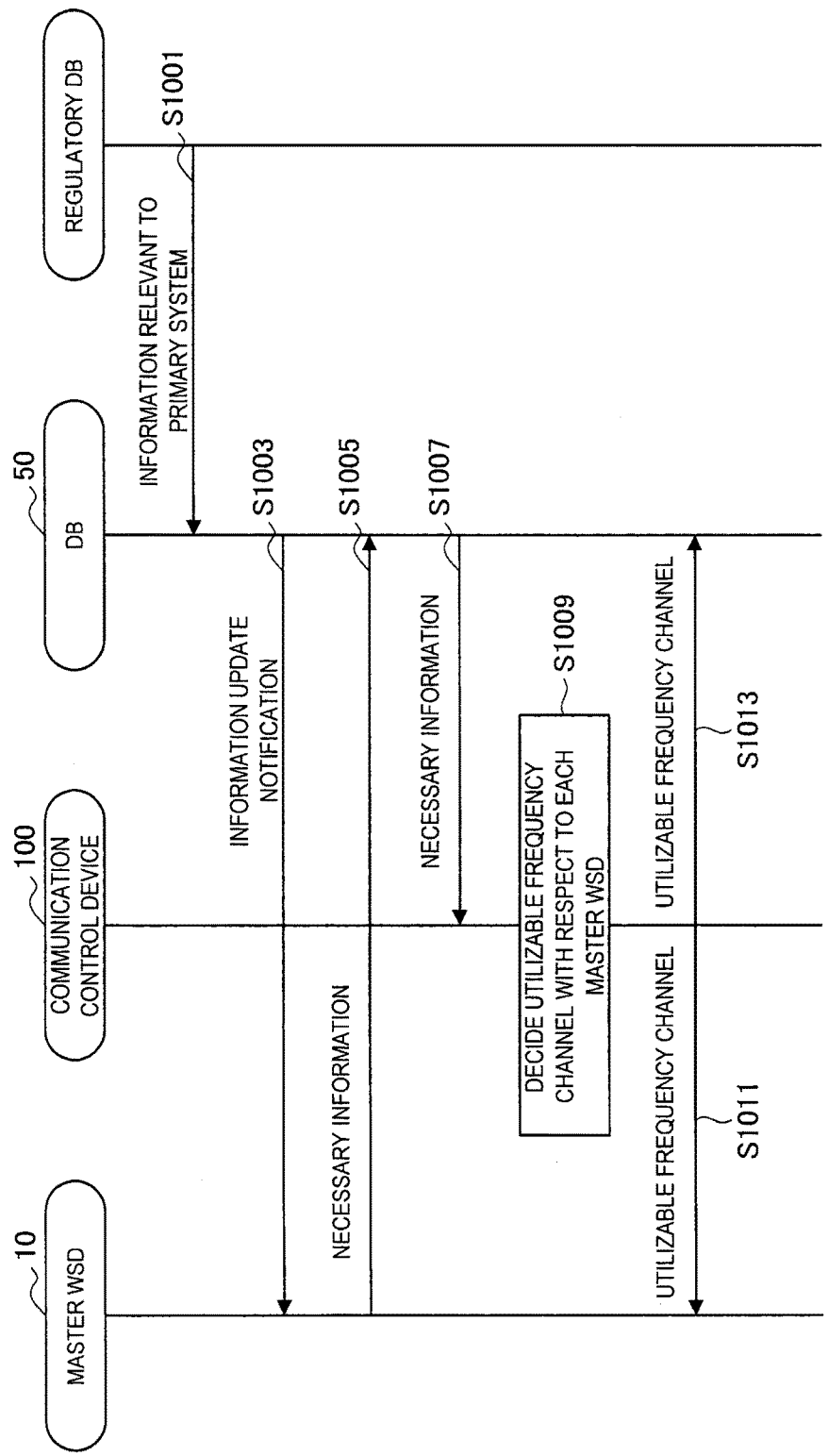
FIG. 3 is a sequence diagram for describing an example of a flow of information in a communication system according to an embodiment of the present disclosure.

With reference to FIG. 3, an example of flow of information in the communication system 1 will be described. FIG. 3 is a sequence diagram for describing an example of the flow of the information in the communication system 1 according to the embodiment of the present disclosure.

The regulatory DB provides the DB 50 with the information relevant to the primary system (S1001).

Also, the DB 50 notifies the master WSD 10 of an update of information (S1003). Then, the master WSD 10 provides the DB 50 with the information necessary for the decision of the utilizable frequency channel (S1005).

Further, the DB 50 provides the communication control device 100 with the information necessary for the decision of the utilizable frequency channel (S1007). Then, the communication control device 100 decides the utilizable frequency channel with respect to each master WSD 10 (S1009).

Then, the communication control device 100 notifies each master WSD 10 of the decided utilizable frequency channel (S1011). Then, each master WSD 10 communicates wirelessly by utilizing the utilizable frequency channel.

Also, the communication control device 100 notifies the DB 50 of the decided utilizable frequency channel (S1013). Then, the DB 50 stores the utilizable frequency channel with respect to each master WSD.

(Location Example of Primary System and Secondary System)

Figure 4:
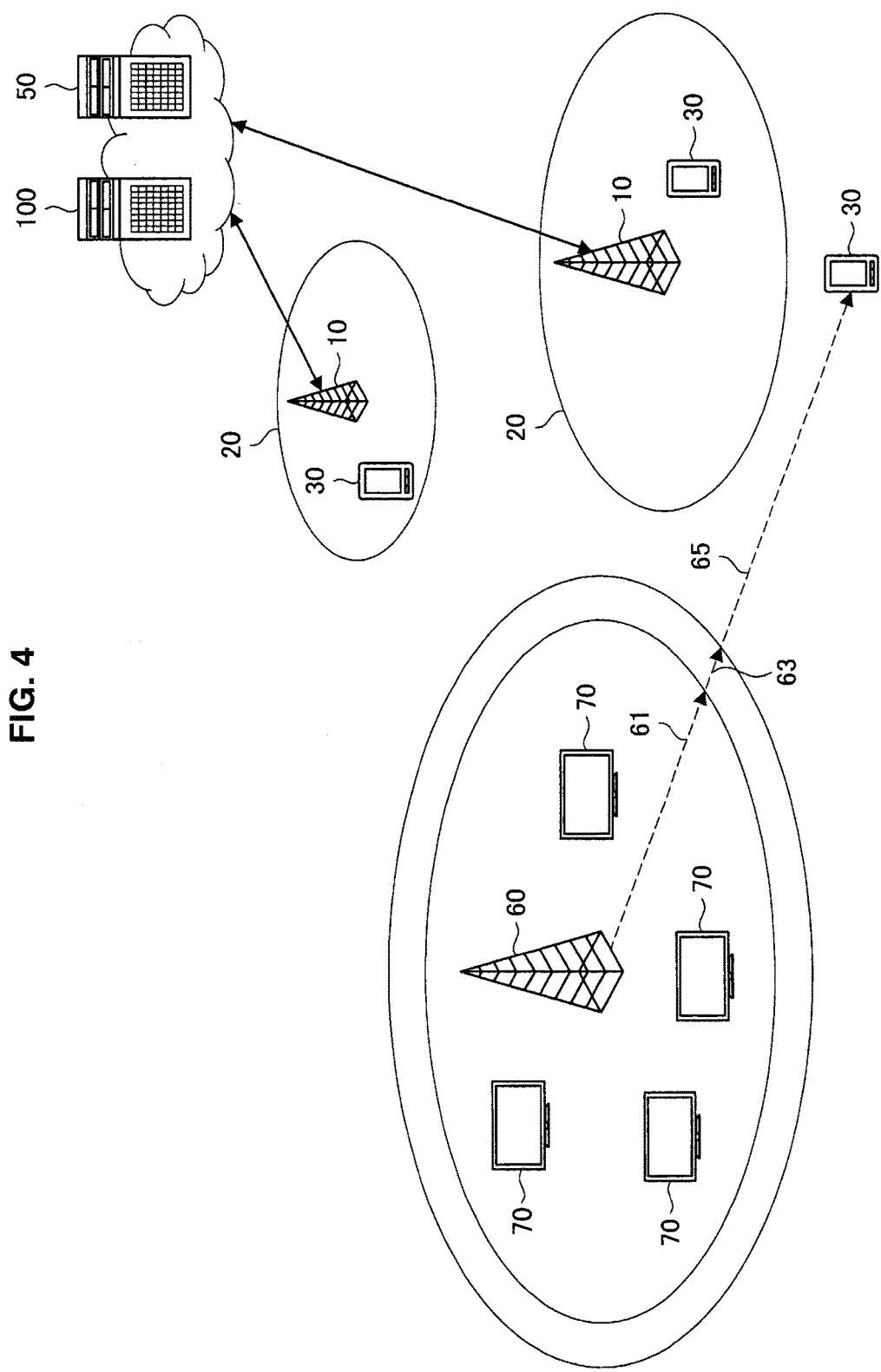
FIG. 4 is an explanatory diagram for describing an example of a location relationship between a primary system and a secondary system.

With reference to FIG. 4, an example of the location relationship between a television broadcast system which is the primary system and the communication system 1 which is the secondary system will be described.

FIG. 4 is an explanatory diagram for describing an example of the location relationship between the primary system and the secondary system. Referring to FIG. 4, the master WSD 10, the slave WSD 30, the DB 50, and the communication control device 100 of the communication system 1 which is the secondary system are illustrated. Also, a transmitter station 60 and reception terminals 70 of the television broadcast system which is the primary system are illustrated. A prohibition area 61 in which secondary utilization of TVWS is prohibited, a protection area 63 for protecting the primary system, and a utilizable area 65 in which secondary utilization of TVWS is permitted are set. Then, the master WSD 10 is located in the utilizable area 65.

(Decision of Utilizable Frequency Channel)

As described above, in the communication system 1 which is the secondary system, the utilizable frequency channel is decided with respect to each master WSD 10. In the following, with reference to FIGS. 5 and 6, a specific example of an example of the decision of the utilizable frequency channel with respect to each master WSD 10 will be described.

Figure 5:
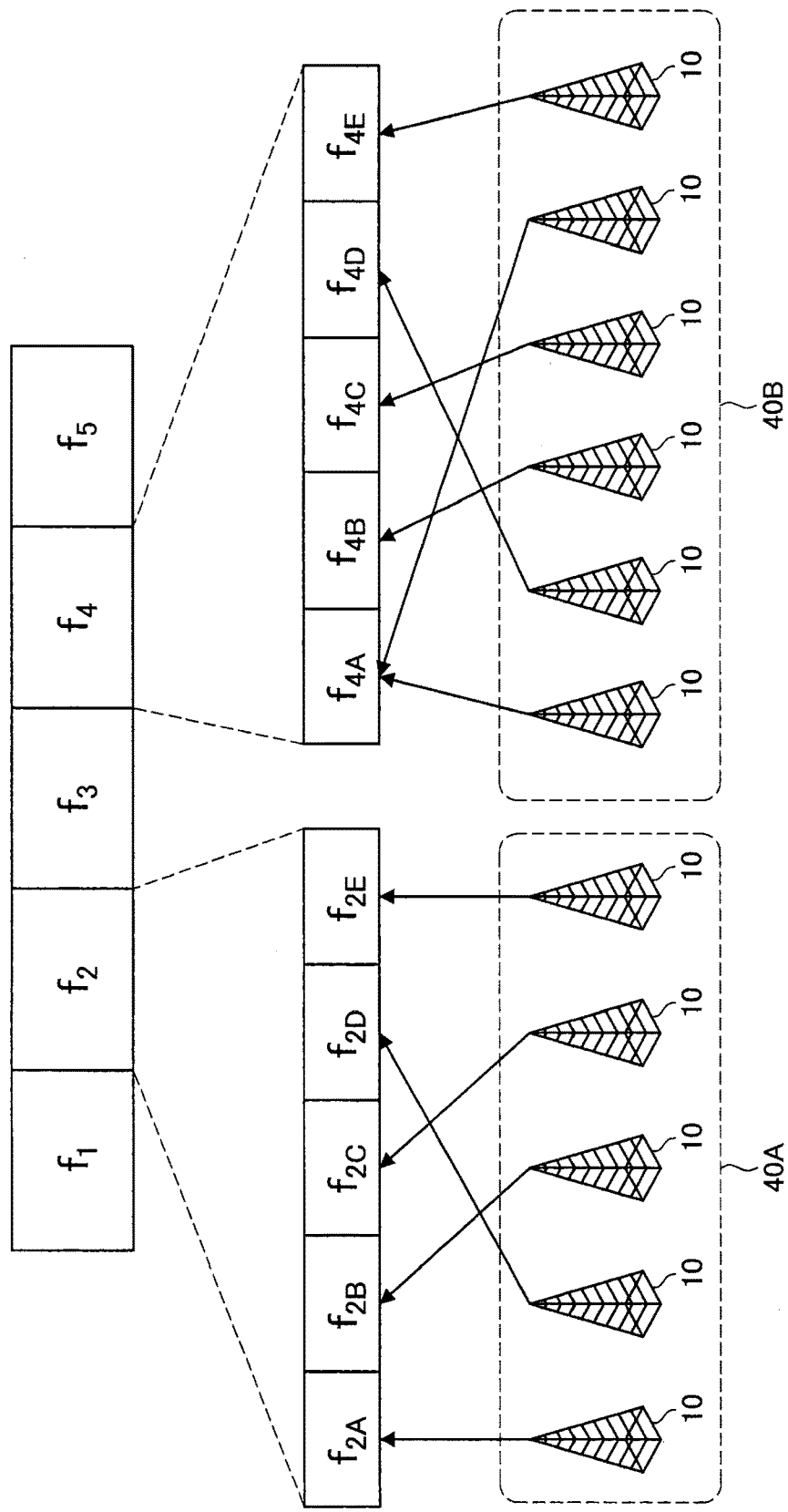
FIG. 5 is an explanatory diagram for describing a first example of a decision of an utilizable frequency channel with respect to each master WSD.

FIG. 5 is an explanatory diagram for describing the first example of the decision of the utilizable frequency channel with respect to each master WSD 10. Referring to FIG. 5, frequency channels $f_1$ to $f_5$ for the primary system is illustrated. In this example, the frequency channel $f_2$ is decided as the utilizable frequency channel with respect to a set 40A of the master WSDs 10. Also, the frequency channel $f_2$ further includes frequency channels $f_{2A}$ to $f_{2E}$. Then, one or more frequency channels of the frequency channels $f_{2A}$ to $f_{2E}$ are decided as the utilizable frequency channels, with respect to each master WSD 10 included in the set 40A. Also, the frequency channel $f_4$ is decided as the utilizable frequency channel with respect to a set 40B of the master WSDs 10. Also, the frequency channel $f_4$ further includes frequency channels $f_{4A}$ to $f_{4E}$. Then, one or more frequency channels of the frequency channels $f_{4A}$ to $f_{4E}$ are decided as the utilizable frequency channels with respect to each master WSD 10 included in the set 40B.

Although, in the example in FIG. 5, the utilizable frequency channels with respect to the set 40A and the utilizable frequency channels with respect to the set 40B are different frequency channels, these frequency channels may be same frequency channels.

Figure 6:
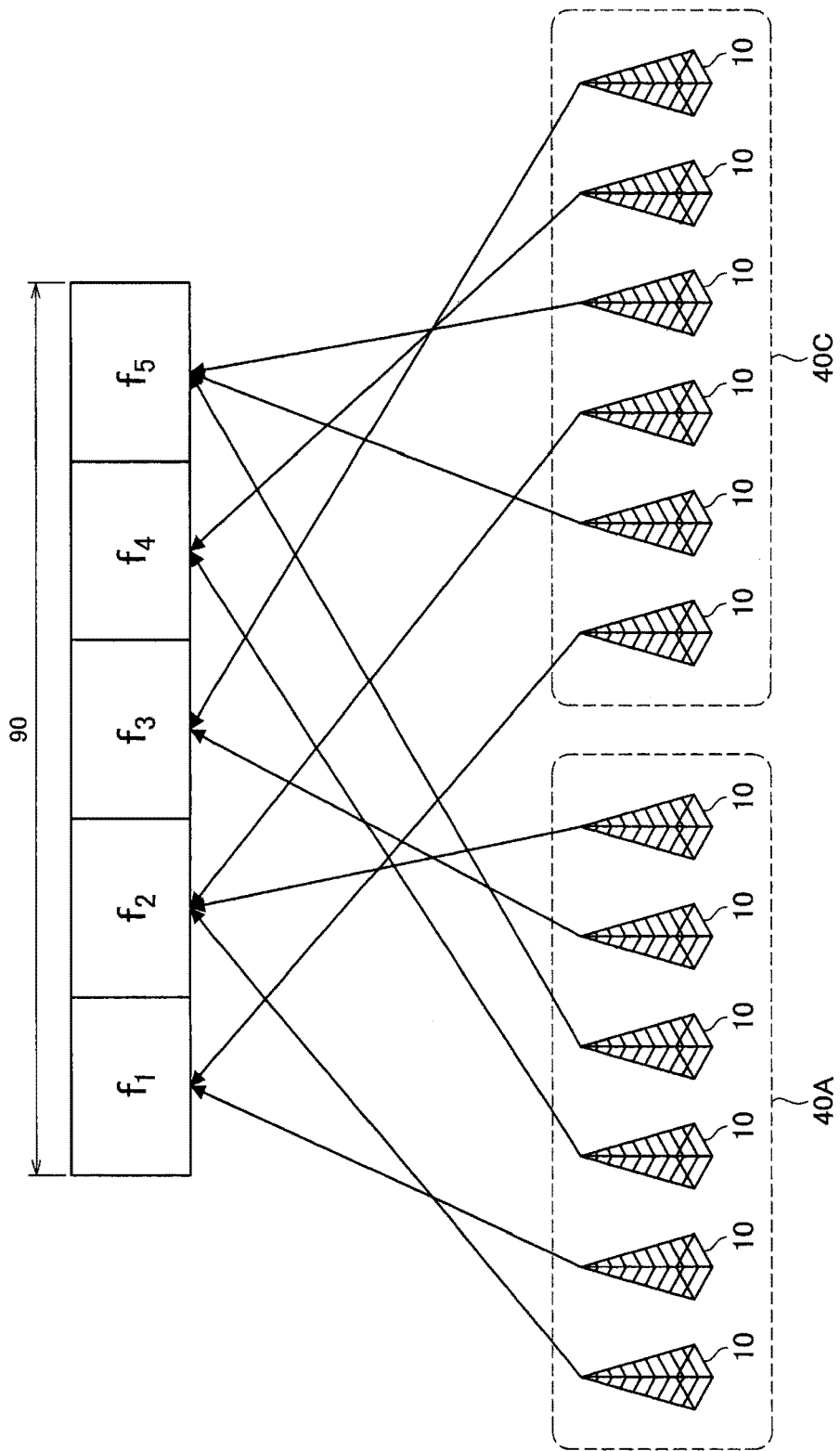
FIG. 6 is an explanatory diagram for describing a second example of a decision of an utilizable frequency channel with respect to each master WSD.

FIG. 6 is an explanatory diagram for describing the second example of the decision of the utilizable frequency channel with respect to each master WSD 10. Referring to FIG. 5, the frequency channels $f_1$ to $f_5$ for the primary system are illustrated. In this example, the utilizable frequency channel with respect to each set 40 is not decided, but the utilizable frequency channel with respect to each master WSD 40 is directly decided.

2. First Embodiment

Next, with reference to FIGS. 7 to 12, the first embodiment of the present disclosure will be described. The first embodiment of the present disclosure improves communication of a communication node that utilizes a radio resource (frequency channel) under an environment in which there is an interference from communication involving a communication node that is not control target, with less calculation amount.

<2.1. Function and Configuration of Communication Control Device>

Figure 7:
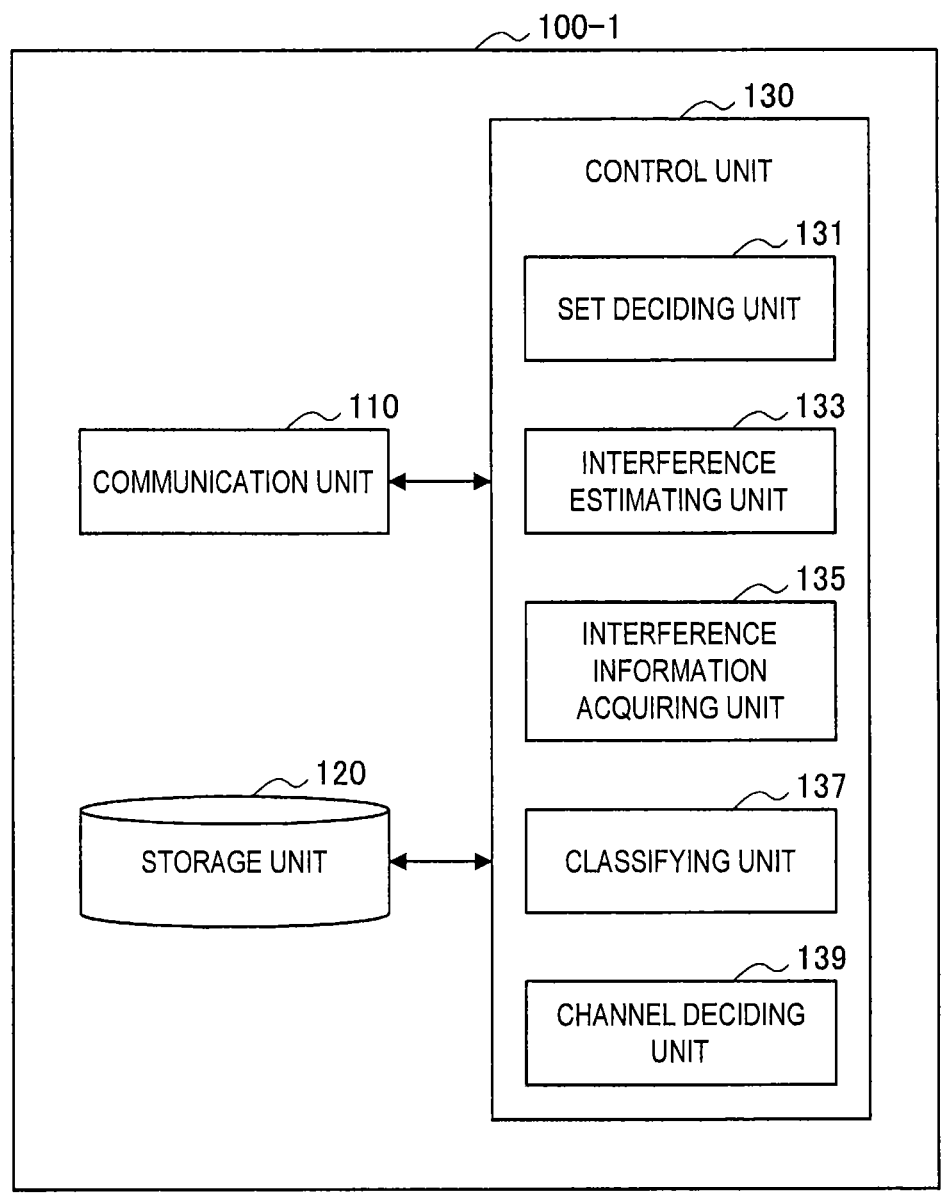
FIG. 7 is a block diagram illustrating an example of a configuration of a communication control device according to a first embodiment.
Figure 8:
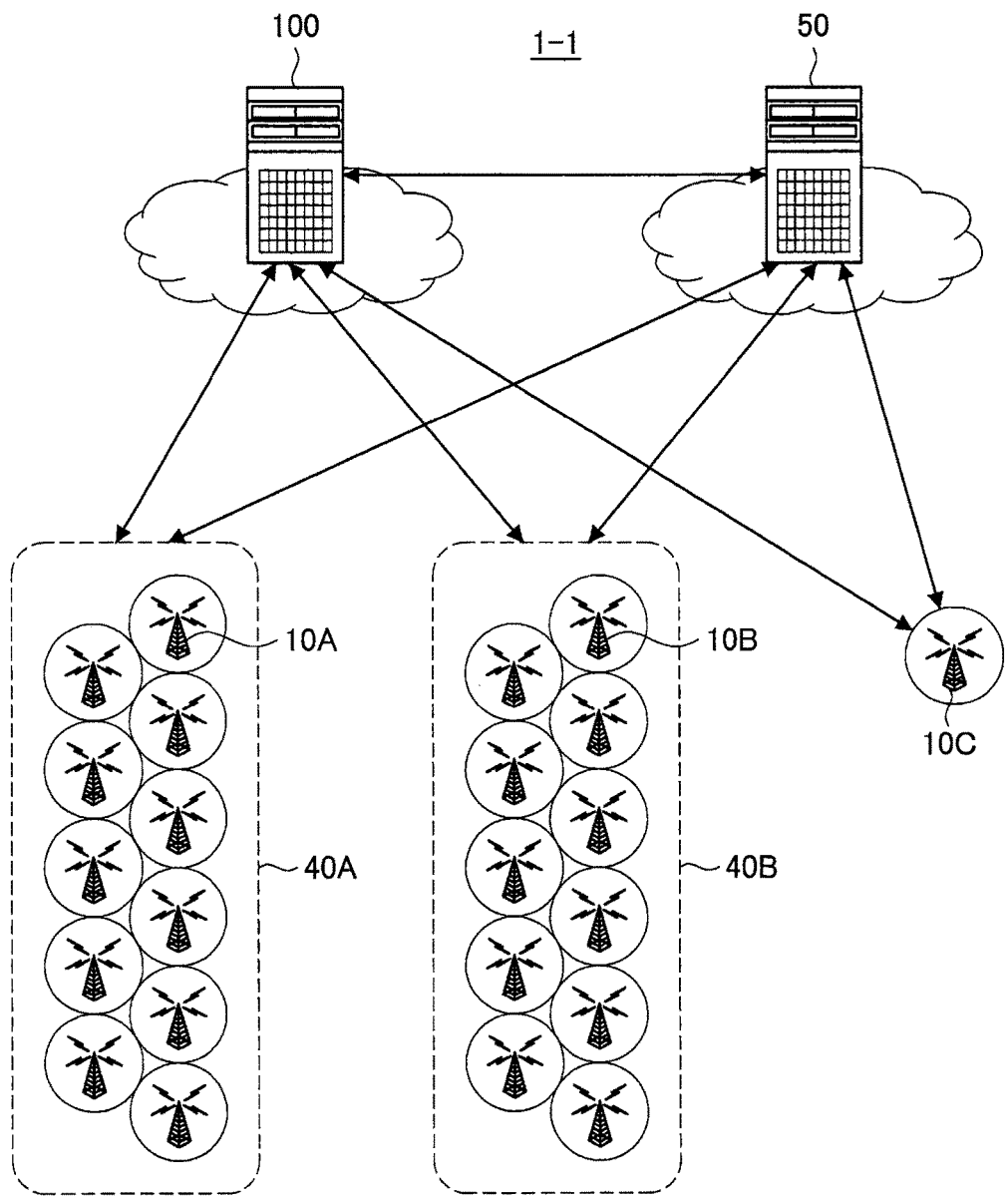
FIG. 8 is an explanatory diagram for describing an example of a group of master WSDs which are decided.
Figure 9:
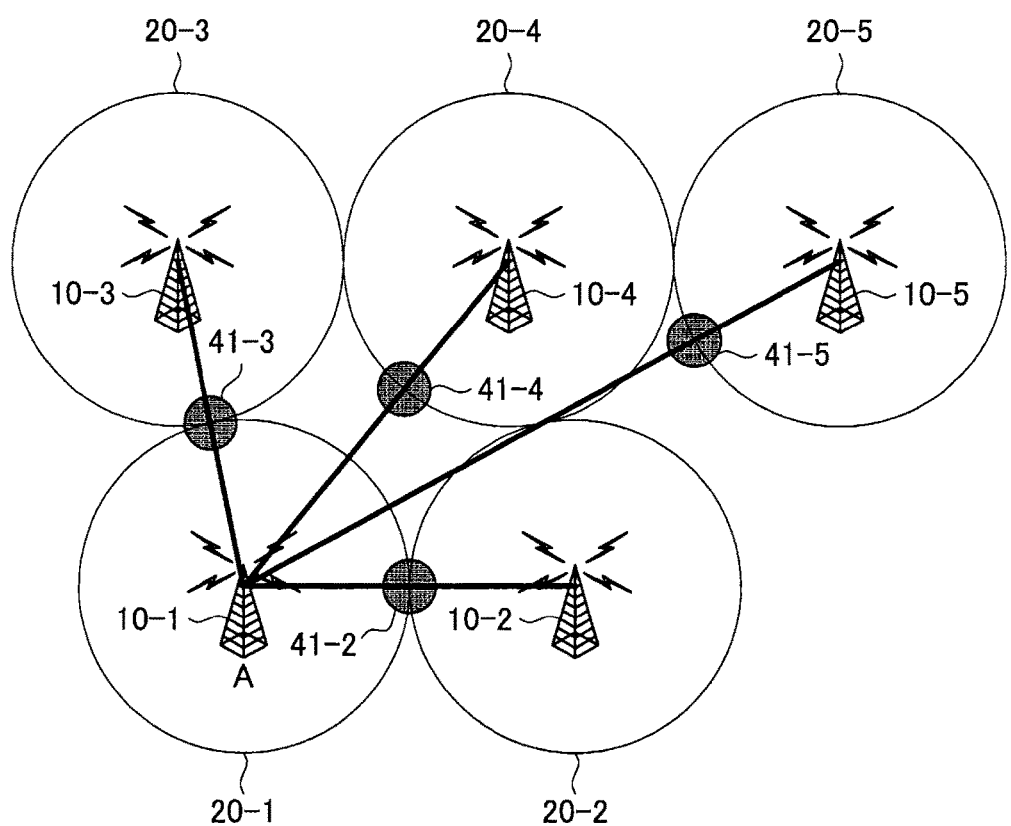
FIG. 9 is an explanatory diagram for describing an example of a position of a slave WSD assumed when estimating an interference by an uplink signal.

With reference to FIGS. 7 to 9, an example of a configuration of a communication control device 100-1 according to the first embodiment will be described. FIG. 7 is a block diagram illustrating an example of the configuration of the communication control device 100-1 according to the first embodiment. Referring to FIG. 7, the communication control device 100-1 includes a communication unit 110, a storage unit 120, and a control unit 130.

(Communication Unit 110)

The communication unit 110 communicates with other devices. For example, the communication unit 110 communicates with the DB 50 and the master WSD 10.

(Storage Unit 120)

The storage unit 120 stores programs and data for the operation of the communication control device 100-1. For example, the storage unit 120 stores information acquired from the DB 50.

(Control Unit 130)

The control unit 130 provides various function of the communication control device 100-1. The control unit 130 includes a set deciding unit 131, an interference estimating unit 133, an interference information acquiring unit 135, a classifying unit 137, and a channel deciding unit 139.

(Set Deciding Unit 131)

The set deciding unit 131 decides the set 40 of the master WSDs 10.

As described above, for example, the set 40 is a set of the master WSDs 10 that can affect each other. For example, the master WSD 10 included in the set 40 interferes with another one of the master WSDs 10 included in the set 40. In this case, the set deciding unit 131 acquires information relevant to each master WSD 10 included in the communication system 1 (for example, number, position, height of antenna, transmission electric power) from the DB 10 via the communication unit 110. Then, the set deciding unit 131 decides the set 40 of the master WSDs 10, on the basis of the acquired information.

As described above, as one example, the set 40 is a set of the master WSDs 10 positioned at a vicinity. In this case, the set deciding unit 131 identifies the master WSDs 10 around each master WSD, on the basis of the position of each master WSD 10 included in the communication system 1. Then, the set deciding unit 131 determines whether or not each master WSD has a large influence on the master WSD 10 nearby. Then, the set deciding unit 131 decides the set 40 of the master WSDs 10, on the basis of the determination result. In the following, with reference to FIG. 8, an example of a set of the master WSDs 10 which is decided will be described.

FIG. 8 is an explanatory diagram for describing an example of a set of the master WSDs 10 which is decided. Referring to FIG. 8, for example, a plurality of master WSDs 10A that exist densely are decided as the set 40A. Also, a plurality of other master WSDs 10B that exist densely are decided as the set 40B. On the other hand, another master WSD 10 does not exist around a master WSD 10C, and therefore any set is not decided with regard to the master WSD 10C.

(Interference Estimating Unit 133)

The interference estimating unit 133 estimates the interference with respect to each of a plurality of master WSDs 10 of control target. Each of the plurality of the master WSDs 10 is the master WSD 10 of the communication system 1 which is the secondary system that secondarily utilizes the frequency channel for the primary system. For example, the above plurality of master WSDs 10 are the master WSDs 10 included in the same set 40, and the interference estimating unit 133 estimates the above interference for each decided set 40.

—First Interference from Communication Involving Communication Node that is not Control Target First, the interference estimating unit 133 estimates a first interference from communication involving the communication node that is not control target, with respect to each of the above plurality of master WSDs 10.

——Communication Node that is not Control Target

For example, the communication node that is not the above control target includes a communication node that is not control target by the communication control device 100-1.

More specifically, for example, the communication node that is not the above control target includes a communication node of the primary system. That is, as an example of the embodiment of the present disclosure, the communication node that is not the above control target includes a transmitter station of the television broadcast system.

——Interference

The above first interference is an interference by a downlink signal transmitted by the communication node that is not the above control target or an uplink signal transmitted to the communication node that is not the above control target. For example, the above first interference includes an interference by a downlink signal transmitted by the transmitter station of the television broadcast system.

Also, for example, the above first interference is an interference to communication involving the master WSD 10. More specifically, the above first interference is an interference to the uplink communication (the transmission to the master WSD 10 from the slave WSD 30) and/or an interference to the downlink communication (the transmission to the slave WSD 30 from the master WSD 10). In other words, the above first interference is an interference to the uplink signal received by the master WSD 10 (the transmission signal of the slave WSD 30) and/or an interference to the downlink signal received by the slave WSD 30 (the transmission signal of the master WSD 10).

As one example, the above first interference is an interference to the uplink communication (i.e., an interference to the uplink signal). Thereby, there is a larger interference to communication involving the master WSD 10. Also, interference is estimated more easily.

Specifically, the antenna of the master WSD 10 is normally at a higher position than the position of the antenna of the slave WSD 30, and therefore the master WSD 10 is affected by the communication node of the primary system (the transmitter station of the television broadcast system) more significantly than the slave WSD 30 is. That is, the interference to the uplink communication is larger than the interference to the downlink communication. Hence, a larger interference to the communication involving the master WSD 10 is obtained, by estimating the interference to the uplink communication as the above first interference.

Also, the master WSD 10 that receives the uplink signal has a lower mobility than the slave WSD 30 that receives the downlink signal. As one example, the position of the slave WSD 30 can be changed frequently, while the position of the master WSD 10 is fixed. Hence, the master WSD 10 can estimate the interference more easily.

——Estimation of Interference

———Estimation of Interference of Each Frequency Channel Candidate

The interference estimating unit 133 estimates the above first interference in each of two or more frequency channel candidates, with respect to each of the above plurality of master WSDs 10. The two or more frequency channel candidates are the frequency channels that the communication system 1 is able to utilize secondarily, among the frequency channels for the primary system.

———Estimation of Electric Power Value

Also, the interference estimating unit 133 estimates a reception electric power value of the interference signal for example, as the above first interference. For example, the electric power value of the interference from communication involving the communication node of the primary system (i.e., the reception electric power value of the transmission signal (interference signal) of the transmitter station of the television broadcast system, in the master WSD 10) is expressed as in the following.

$$P_{I,Primary,n}(f) \quad \text{[Math. 1]}$$

Here, n represents an index of the master WSD 10 of target for estimating an interference, among the above plurality of master WSDs 10. Also, f represents one frequency channel candidate among a plurality of frequency channel candidates.

Note that the interference estimating unit 133 acquires parameters that are necessary for referring to the information relevant to the primary system, the information relevant to the secondary system, and the interference electric power, from the DB 50 via the communication unit 110, for example. Then, the interference estimating unit 133 estimates the above first interference, on the basis of the acquired information. As described above, the information relevant to the primary system includes the information relevant to the communication node (the transmitter station) of the primary system (e.g., number, position, height of antenna, transmission electric power), for example. Also, as described above, the information relevant to the secondary system includes, the information relevant to the master WSD 10 of the secondary system (for example, number, position, height of antenna, transmission electric power), for example.

——Second Interference from Communication Involving Another Communication Node of Control Target Second, the interference estimating unit 133 estimates the second interference from communication involving another communication node of control target, with respect to each of the above plurality of master WSDs 10 of control target.

————Another Communication Node of Control Target

For example, the above other communication node of control target is a communication node which is control target by the communication control device 100-1.

More specifically, for example, the above other communication node includes another master WSDs 10 that are not the master WSD 10 for which the interference is estimated, among the above plurality of master WSDs 10. As one example, the above other communication node includes another master WSD 10 that is not the master WSD 10 for which the interference is estimated and is included in the same set 40 as the master WSD 10 for which the interference is estimated, among the above plurality of master WSDs 10.

————Interference

The above second interference is an interference by the downlink signal transmitted by the above other communication node or the uplink signal transmitted to the above other communication node. For example, the above second interference includes an interference by the downlink signal transmitted by another master WSD 10 that is not the master WSD for which the interference is estimated, or an interference by the uplink signal transmitted to another master WSD 10 that is not the master WSD for which the interference is estimated.

Also, for example, the above second interference is an interference to communication involving the master WSD 10. More specifically, the above second interference is an interference to the uplink communication (the transmission to the master WSD 10 from the slave WSD 30) and/or an interference to the downlink communication (the transmission to the slave WSD 30 from the master WSD 10). In other words, the above second interference is an interference to the uplink signal received by the master WSD 10 (the transmission signal of the slave WSD 30) and/or an interference to the downlink signal received by the slave WSD 30 (the transmission signal of the master WSD 10).

As one example, the above second interference is an interference to the uplink communication (i.e., an interference to the uplink signal). Thereby, there is a larger interference to communication involving the master WSD 10. Also, interference is estimated more easily.

————Estimation of Interference

——————Estimation of Interference of Each Frequency Channel Candidate

The interference estimating unit 133 estimates the above second interference in each of the two or more frequency channel candidates, with respect to each of the above plurality of master WSDs 10. The two or more frequency channel candidates is a frequency channel that the communication system 1 is able to utilize secondarily, among the frequency channels for the primary system. Also, here, the above two or more frequency channel candidates are two or more frequency channel candidates. That is, the above second interference in each of the two or more frequency channel candidates is estimated.

——————Provisional Setting of Frequency Channel

Also, for example, the interference estimating unit 133 provisionally sets the frequency channel utilized by each of a plurality of master WSDs 10 of control target, to calculate the above second interference.

Specifically, for example, the frequency channel utilized immediately before is set provisionally. For example, when a certain communication node utilizes a certain frequency channel immediately before, the certain frequency channel is set provisionally in the certain communication node. Also, when another communication node utilizes another frequency channel immediately before, the other frequency channel is set provisionally in the other communication node.

Note that it may be such that the provisionally set frequency channel is not the frequency channel utilized immediately before, but a frequency channel for which the interference from the primary system is small, a frequency channel selected on the basis of a result of measurement or sensing, a frequency channel selected at random, or the like.

——————Estimation of Interference in Individual Frequency Channels

Also, the above second interference in the individual frequency channel candidates is estimated by estimating the interference from communication involving each of the above other communication nodes of control target (other master WSDs 10) first, and summing the interference estimated with respect to each of the above other communication node.

For example, the interference from the communication involving each of other master WSDs 10 of control target is any one of the followings.

(1) An interference from transmission only of the master WSD 10 (an interference by the downlink signal only)

(2) An interference from transmission only of the slave WSD 30 (an interference by the uplink signal only)

(3) An interference from the transmission of the master WSD 10 and the transmission of the slave WSD 30 (an interference by the downlink signal and the uplink signal)

The interference of above (1) is an interference when the master WSD 10 performs the downlink communication only. For example, the interference estimating unit 133 can estimate the interference of above (1) on the basis of information relevant to the master WSD 10 (position, height of antenna, transmission electric power, etc.) and information of provisional setting of the frequency channel.

The interference of above (2) is an interference when the master WSD 10 performs the uplink communication only. For example, the interference estimating unit 133 suppositionally sets information relevant to the slave WSD 30 (position, height of antenna, transmission electric power, etc.), and estimates the interference of above (2) on the basis of the suppositionally set information and the information of the provisional setting of the frequency channel.

The interference of above (3) is an interference when the master WSD 10 performs both of the uplink communication and the downlink communication. The frequency channel candidates for the uplink communication and the frequency channel candidates for the downlink communication are different frequency channel candidates in some cases (for example, in the case of FDD), and are same frequency channels in other cases (for example, in the case of TDD). In the former case, the interference estimating unit 133 estimates the interference from the downlink communication (the interference by the downlink signal) in the same way as the interference of above (1), and estimates the interference from the uplink communication (the interference by the uplink signal) in the same way as the interference of above (2), and sums the estimated interferences. Also, in the latter case, the interference estimating unit 133 estimates the interference from one of the downlink communication and the uplink communication. Note that, in the latter case, for example, the interference estimating unit 133 estimates the interference from the downlink communication (the interference by the downlink signal) and the interference from the uplink communication (the interference by the uplink signal), and selects the larger one. By this selection, a larger interference to the communication involving the master WSD 10 is estimated.

Note that, as described above, when the interference from the transmission of the slave WSD 30 (the interference by the uplink signal) is estimated, the information relevant to the slave WSD 30 (position, height of antenna, transmission electric power, etc.) is suppositionally set. In this case, for example, the slave WSD 30 is assumed to exist in a predetermined range or at a predetermined position closer to the master WSD 10 for which the interference is estimated, within the communication range 20 of the master WSD 10 which is the transmission destination of the uplink signal of the slave WSD 30. Then, the interference estimating unit 133 estimates the interference by the uplink signal, under this assumption. In the following, a specific example will be described with reference to FIG. 9, with respect to this point.

FIG. 9 is an explanatory diagram for describing an example of the position of the slave WSD 30 which is suppositionally set when estimating the interference by the uplink signal. Referring to FIG. 9, the master WSDs 10-1 to 10-5 are illustrated. In this example, the interference to the uplink communication of the master WSD 10-1 is estimated. In this case, for example, the slave WSD 30 that transmits the uplink signal to the master WSD 10-2 is assumed to be positioned at the position 41-2 closest to the master WSD 10-1, within the communication range 20-2 of the master WSD 10-2. Also, the slave WSD 30 that transmits the uplink signal to the master WSD 10-5 is assumed to be positioned at the position 41-5 closest to the master WSD 10-1 within the communication range 20-5 of the master WSD 10-5.

By this assumption, a larger interference to the communication involving the master WSD 10 is obtained.

——Estimation of Electric Power Value

Also, the interference estimating unit 133 estimates the reception electric power value of the interference signal for example, as the above second interference. For example, the electric power value of the interference from communication involving another master WSD 10 of control target (i.e., the reception electric power value of the downlink signal from another master WSD 10 and/or the uplink signal to another master WSD 10 (the interference signal), in the master WSD 10) is expressed as in the following.

$$P_{I,WSD,n}(f) \qquad \text{[Math. 2]}$$

Here, n represents an index of the master WSD 10 of target for estimating an interference, among the above plurality of master WSDs 10. Also, f represents one frequency channel candidate among a plurality of frequency channel candidates.

Note that the interference estimating unit 133 acquires the information relevant to the secondary system, from the DB 50, via the communication unit 110, for example. Also, as described above, the interference estimating unit 133 suppositionally sets the information relevant to the slave WSD 30 (position, height of antenna, transmission electric power, etc.). Then, the interference estimating unit 133 estimates the above second interference, on the basis of the acquired information and/or the suppositionally set information. As described above, the information relevant to the secondary system includes the information relevant to the master WSD 10 of the secondary system (for example, number, position, height of antenna, transmission electric power), for example.

(Interference Information Acquiring Unit 135)

—First Interference Information

The interference information acquiring unit 135 acquires the first interference information indicating the first interference from communication involving the communication nodes that are not control target, with respect to each of a plurality of master WSDs 10 of control target. For example, the above plurality of master WSDs 10 are the master WSDs 10 included in the same set 40, and the interference estimating unit 133 acquires the above first interference information for each decided set 40.

As described above, for example, the communication nodes that are not the above control target include the communication nodes that are not control target by the communication control device 100-1. More specifically, for example, the communication nodes that are not the above control target include the communication nodes of the primary system. That is, as an example of the embodiment of the present disclosure, the communication nodes that are not the above control target include the transmitter station of the television broadcast system.

Also, for example, the above first interference information indicates the above first interference in each of the two or more frequency channel candidates. As described above, the above two or more frequency channel candidates are frequency channels that the communication system 1 is able to utilize secondarily, among the frequency channels for the primary system. Also, here, the above two or more frequency channel candidates are two or more frequency channel candidates. That is, the first interference information indicates the above first interference in each of the above two or more frequency channel candidates.

For example, the interference information acquiring unit 135 acquires the information indicating the first interference estimated by the interference estimating unit 133, as the first interference information.

Note that the interference information acquiring unit 135 may acquire the information indicating the first interference that is actually observed, or the information indicating the first interference calculated in advance as the theoretical value from path-loss and the like (i.e., the information store in the DB 50), as the first interference information, instead of the information indicating the first interference estimated by the interference estimating unit 133. In this case, the first interference is needless to be estimated by the interference estimating unit 133 as described above.

—Second Interference Information

Also, the interference information acquiring unit 135 acquires the second interference information indicating the second interference from communication involving another communication node of control target, with respect to each of a plurality of master WSDs 10 of control target. For example, the above plurality of master WSDs 10 are the master WSDs 10 included in the same set 40, and the interference estimating unit 133 acquires the above second interference information for each decided set 40.

As described above, for example, the above other communication node of control target is the communication node which is control target by the communication control device 1004. More specifically, for example, the above other communication node includes another master WSDs 10 that are not the master WSD 10 for which the interference is estimated, among the above plurality of master WSDs 10.

Also, for example, the above second interference information indicates the above second interference in each of the above two or more frequency channel candidates. As described above, the above two or more frequency channel candidates are frequency channels that the communication system 1 is able to utilize secondarily, among the frequency channels for the primary system. Also, here, the above two or more frequency channel candidates are two or more frequency channel candidates. That is, the second interference information indicates the above second interference in each of the above two or more frequency channel candidates.

For example, the interference information acquiring unit 135 acquires the information indicating the second interference estimated by the interference estimating unit 133, as the second interference information.

Note that the interference information acquiring unit 135 may acquire the information indicating the second interference that is actually observed, or the information indicating the second interference calculated in advance as the theoretical value from path-loss and the like (i.e., the information store in the DB 50), as the second interference information, instead of the information indicating the second interference estimated by the interference estimating unit 133. In this case, the second interference is needless to be estimated by the interference estimating unit 133 as described above.

(Classifying Unit 137)

The classifying unit 137 classifies the above plurality of master WSDs 10 into a plurality of groups related to the decision of the frequency channel that the master WSD 10 is able to utilize, on the basis of the above first interference information and the above second interference information with respect to the above plurality of master WSDs 10 of control target. Also, for example, the above plurality of master WSDs 10 are the master WSDs 10 included in the same set 40, and the classifying unit 137 classifies the master WSDs 10 for each decided set 40.

Also, for example, the above plurality of groups are a plurality of groups corresponding to the order in which the above frequency channels are decided. More specifically, for example, the above plurality of groups include at least a first group and a second group. The above second group is a group in which the above frequency channels are decided after the above first group or before the first group. The classifying unit 137 classifies the above plurality of master WSDs into a plurality of groups including the above first group and the above second group. As one example, the classifying unit 137 classifies the above plurality of master WSDs 10 into the two groups of the above first group and the above second group.

Also, for example, the master WSDs 10 classified into the above first group is the master WSD 10 having a larger level of the above first interference relative to the above second interference, as compared with the master WSD 10 classified into the above second group. That is, the classifying unit 137 classifies the above plurality of master WSDs 10 into a plurality of groups including the above first group and the above second group, in such a manner that the master WSDs 10 classified into the above first group has a larger level of the above first interference relative to the above second interference, as compared with the master WSD 10 classified into the above second group. As one example, the classifying unit 137 classifies, into the first group, the master WSD 10 having a larger level of the above first interference relative to the above second interference, among the above plurality of master WSDs 10. Also, the classifying unit 137 classifies, into the second group, the master WSD 10 having a smaller level of the above first interference relative to the above second interference, among the above plurality of master WSDs 10.

Also, for example, the above second group is a group in which the above frequency channels are decided after the above first group. In this case, as one example, the classifying unit 137 classifies, into the first group in which the utilizable frequency channels are first decided, the master WSD 10 having a larger level of the above first interference relative to the above second interference, among the above plurality of master WSDs 10. Also, the classifying unit 137 classifies, into the second group in which the utilizable frequency channels are decided later, the master WSD 10 having a smaller level of the above first interference relative to the above second interference, among the above plurality of master WSDs 10.

By this classification, for example, the utilizable frequency channels with respect to the master WSD 10 having a comparatively weak interference in the secondary system relative to the interference from the primary system are decided first. Then, the utilizable frequency channels with respect to the master WSD 10 having a comparatively strong interference in the secondary system relative to the interference from the primary system are decided thereafter. That is, the utilizable frequency channels with respect to the master WSD 10 having a smaller influence on the interference by the decision of the utilizable frequency channels in the secondary system (for example, the fluctuation of the interference level) are decided first. Then, the utilizable frequency channels with respect to the master WSD 10 having a larger influence on the interference by the decision of the utilizable frequency channel in the secondary system (for example, the fluctuation of the interference level) are decided thereafter.

Hence, a more appropriate utilizable frequency channel is decided with respect to the master WSD 10 having a larger influence of the decision of the utilizable frequency channel in the secondary system, in consideration of the utilizable frequency channels that are already decided with respect to other master WSDs 10. On the other hand, with respect to the master WSD 10 having a smaller influence of the decision of the utilizable frequency channel in the secondary system, the influence (for example, the fluctuation of the interference level) occurs by the following decision of the utilizable frequency channel with respect to other master WSDs 10, but the influence is small. Thereby, a more appropriate utilizable frequency channel with respect to each master WSD 10 can be decided in the secondary system. As a result, the communication of the master WSD 10 that secondarily utilizes the frequency channel can be improved.

Also, the utilizable frequency channel is decided in order for each group (i.e., divided utilizable frequency channels with respect to the master WSD 10 are decided in order), and therefore the number of combinations of the master WSD 10 and the frequency channel candidate decreases. As a result, the calculation amount can be reduced.

As described above, communication of a communication node that utilizes a radio resource (frequency channel) under an environment in which there is an interference from communication involving a communication node that is not control target is improved with less calculation amount.

Also, more specifically, for example, the above level of the above first interference relative to the above second interference corresponds to the number of frequency channel candidates in which the level of the above first interference is larger than the level of the above second interference by a predetermined threshold value or more. For example, the level of the above first interference and the level of the second interference is the reception electric power of the interference signal in the master WSD 10 that is subject to the interference. Then, the above level of the above first interference relative to the above second interference corresponds to the number of frequency channel candidates in which the level of the first interference (the reception electric power of the interference signal) is larger than the level of the second interference (the reception electric power of the interference signal) by a predetermined threshold value. As one example, the above a predetermined threshold value is 0, and the above level is the proportion of the frequency channel candidates in which the level of the first interference is larger than the second interference. Then, the classifying unit 137 classifies the master WSD 10 having the above proportion that exceeds a threshold value x (0<x<1), into the first group in which the utilizable frequency channels are first decided. Also, the classifying unit 137 classifies the master WSD 10 having the above proportion that is equal to or less than the threshold value x, into the second group in which the utilizable frequency channels are decided later. That is, the classifying unit 137 classifies a plurality of master WSDs 10 as in the following.

[Math. 3]

$$n \in \begin{cases} G^{1st} & \text{if } \operatorname{card}\{p|P_{I,Primary,n}(f) > P_{I,WSD,n}(f)\}/N_{Channel} > x \\ G^{2nd} & \text{else} \end{cases}$$

Here, n represents an index of the master WSD 10 of the target to be classified, among the above plurality of master WSDs 10. Also, $G^{1st}$ indicates the first group, and $G^{2nd}$ indicates the second group. Also, f represents one frequency channel candidate among a plurality of frequency channel candidates. $N_{channel}$ indicates the number of the frequency channel candidates (i.e., the number of the frequency channels that the communication system 1 is able to utilize). P indicates a set of frequency channels that satisfy $P_{I,Primary,n}(f) > P_{I,WSD,n}(f)$. Then, card { • • • } is the cardinality of the set. When elements of the set is discrete, card { • • • } is equivalent to the number of the elements of the set (i.e., the number of the frequency channel candidates). Also, as described above, x is a threshold value that is larger than 0 and smaller than 1.

This classification into the groups enables classifying the master WSD 10 having a comparatively weak interference in the secondary system relative to the interference from the primary system, and the master WSD 10 having a comparatively strong interference in the secondary system relative to the interference from the primary system.

(Channel Deciding Unit 139)

The channel deciding unit 139 decides the utilizable frequency channel with respect to each of the above plurality of master WSDs 10 of control target. For example, the above plurality of master WSDs 10 are the master WSDs 10 included in the same set 40, and the interference estimating unit 133 classifies the master WSDs 10 for each decided set 40.

—Decision in Order According to Group

For example, the channel deciding unit 139 decides the above frequency channel with respect to each of one or more master WSDs 10 classified into the above first group. Also, the channel deciding unit 139 decides the above frequency channel with respect to each of one or more master WSDs 10 classified into the above second group, on the basis of the decision result of the above frequency channel in the above first group.

—Decision of Frequency Channel in First Group

As described above, the master WSDs 10 classified into the above first group is the master WSD 10 having a larger level of the above first interference relative to the above second interference, as compared with the master WSD 10 classified into the above second group.

For example, the channel deciding unit 139 decides one or more frequency channel candidates having a smaller level of the above first interference, among the two or more frequency channel candidates, as the utilizable frequency channel with respect to the master WSDs 10 classified into the above first group. The two or more frequency channel candidates are the frequency channels that the communication system 1 is able to utilize secondarily, among the frequency channels for the primary system.

This decision of the frequency channel reduces the interference from the primary system in the master WSD 10 classified into the first group (for example, the master WSD 10 having a comparatively strong interference from the primary system relative to the interference in the secondary system), for example. Hence, the communication quality of the master WSD 10 classified into the first group improves, and the communication of the master WSD can be improved. Note that this decision is effective, in particular when there is a variation in the level of the interference from the primary system by the frequency channel candidate.

Note that, as another example, the channel deciding unit 139 may decide one or more frequency channel candidates utilized by the master WSDs 10 classified into the above first group, as the utilizable frequency channel with respect to the master WSD 10. With this decision of the frequency channel, the decision is needless to be made again, and therefore the calculation amount is reduced. Note that this decision is effective, in particular when there is little variation in the level of the interference from the primary system by the frequency channel candidates.

Also, as yet another example, the channel deciding unit 139 may decide as the utilizable frequency channel with respect to the master WSDs 10 classified into the above first group, by another method.

—Decision of Frequency Channel in Second Group

As described above, the master WSD 10 classified into the above second group is the master WSD 10 having a smaller level of the above first interference relative to the above second interference, as compared with the master WSD 10 classified into the above second group.

As described above, for example, the channel deciding unit 139 decides the above frequency channel with respect to each of one or more master WSDs 10 classified into the above second group, on the basis of the decision result of the above frequency channel in the above first group.

——Order of Decision of Frequency Channel

As described above, the channel deciding unit 139 decides the above resource (the frequency channel) with respect to each of the above one or more master WSDs 10 classified into the above second group. For example, here, the channel deciding unit 139 decides the above frequency channel with respect to the master WSD 10 having a smaller level of the above second interference. Then, the channel deciding unit 139 decides the above frequency channel with respect to the master WSD 10 having a larger level of the above second interference, on the basis of the decision result of the above frequency channel with respect to the master WSD 10. That is, the channel deciding unit 139 decides the utilizable frequency channel with respect to the master WSD 10, in order from the master WSD 10 having a smaller level of the second interference.

More specifically, for example, the channel deciding unit 139 decides the utilizable frequency channel, in order from the master WSD 10 having a smaller maximum level of the level of the second interference in the two or more frequency channel candidates. For example, above the maximum level is, the maximum level of the electric power value of the interference from communication involving another master WSD 10 of control target (i.e., the reception electric power value of the interference signal) $P_{I,WSD,n}(f)$ in the two or more frequency channel candidates. The maximum level $P_{I\_MAX,WSD,n}$ is expressed as in the following.

$$P_{I\_MAX,WSD,n} = \max_{f} P_{I,WSD,n}(f) \qquad \text{[Math. 4]}$$

As described above, for example, the channel deciding unit 139 decides the utilizable frequency channel in order from the smaller maximum level $P_{I\_MAX,WSD,n}$. Then, for example, the channel deciding unit 139 decides the utilizable frequency channel with respect to the k-th master WSD 10, on the basis of the decision result with respect to the first to k−1th master WSDs 10. Also, for example, the channel deciding unit 139 decides the utilizable frequency channel with respect to the k-th master WSD 10, on the basis of the provisional setting result of the frequency channel with respect to the k+1th and following master WSDs 10 as well.

By the decision in this order, the utilizable frequency channel with respect to the master WSD 10 having a weaker interference in the secondary system is decided first, for example. Then, the utilizable frequency channel with respect to the master WSD 10 having a stronger interference in the secondary system is decided thereafter. That is, the utilizable frequency channels with respect to the master WSD 10 having a smaller influence on the interference by the decision of the utilizable frequency channels in the secondary system (for example, the fluctuation of the interference level) are decided first. Then, the utilizable frequency channels with respect to the master WSD 10 having a larger influence on the interference by the decision of the utilizable frequency channel in the secondary system (for example, the fluctuation of the interference level) are decided thereafter.

Hence, a more appropriate utilizable channel is decided with respect to the master WSD 10 having a larger influence of the decision of the utilizable frequency channel in the secondary system, in consideration of the utilizable frequency channels that are already decided with respect to other master WSDs 10. On the other hand, with respect to the master WSD 10 having a smaller influence of the decision of the utilizable frequency channel in the secondary system, the influence (for example, the fluctuation of the interference level) occurs by the following decision of the utilizable frequency channel with respect to other master WSDs 10, but the influence is small. Thereby, a more appropriate utilizable frequency channel with respect to each master WSD 10 can be decided in the secondary system. As a result, the communication of the master WSD 10 that secondarily utilizes the frequency channel can be improved.

Also, the utilizable frequency channels are decided one after another with respect to each master WSD 10, and therefore the calculation amount can be reduced.

Note that, as described above, the channel deciding unit 139 decides the utilizable frequency channel with respect to the k-th master WSD 10, on the basis of the decision result of the frequency channel in the above first group.

——Decision of Frequency Channel

Also, for example, the channel deciding unit 139 decides one or more frequency channel candidates among the two or more frequency channel candidates, as the utilizable frequency channel with respect to the master WSD 10 classified into the above second group. Then, the one or more frequency channel candidates are one or more frequency channel candidates having a smaller level of the interference, which include the above first interference and the above second interference.

Specifically, for example, to decide the utilizable frequency channel with respect to the k-th master WSD 10, the channel deciding unit 139 acquires the knowledge of the level of the first interference in each of the two or more frequency channel candidates, from the first interference information. Also, the channel deciding unit 139 estimates the second interference in each of the two or more frequency channel candidates again, or causes the interference estimating unit 133 to estimate again.

As described above, for example, the level of the first interference is expressed by the reception electric power value) of the transmission signal (the interference signal) of the transmitter station of the primary system (the television broadcast system) $P_{I,Primary,n}(f)$. Also, for example, the level of the second interference is expressed by the electric power value of the interference from communication involving another master WSD 10 of control target (i.e., the reception electric power value of the interference signal) $P_{I,WSD,n}(f)$. Then, the channel deciding unit 139 calculates the following worst interference electric power value $P_{I,worst,n}(f)$, as the interference level including the first interference and the second interference.

$$P_{I,worst,n}(f) = P_{I,Primary,n}(f) + P_{I,WSD,n}(f) \qquad \text{[Math. 5]}$$

Then, for example, the channel deciding unit 139 decides the frequency channel candidates having minimum worst interference electric power value $P_{I,worst,n}(f)$, as the utilizable frequency channel with respect to the k-th master WSD 10.

For example, with this decision of the frequency channel, the utilizable channel is decided with respect to the master WSD 10, so as to reduce the interference level of the worst time. As a result, the communication of the master WSD 10 can be improved.

——Decision of Frequency Channel with Respect to Master WSD that is not Classified into Group Also, for example, the channel deciding unit 139 decides the utilizable frequency channel with respect to the master WSD 10 that is not classified into any group.

——Notification to Master WSD

As described above, the channel deciding unit 139 decides the utilizable frequency channel with respect to each of the above plurality of master WSDs 10 of control target. For example, thereafter, the channel deciding unit 139 notifies each master WSD 10 of the decided utilizable frequency channel via the communication unit 110.

In the above, the method of the decision of the utilizable frequency channel has been described. Note that, the utilizable frequency channel may be decided ultimately, so that the interaction for the notification to the master WSD 10 of the utilizable channel is reduced. For example, it is not such that the utilizable frequency channel is necessarily decided and notified as described above, but may be such that the utilizable frequency channel is ultimately decided and notified when an additional predetermined condition is satisfied. As one example, the above predetermined condition may be a fact that the level of the difference between the interference in the utilizable channel decided last time and the interference in the utilizable frequency channel decided this time exceeds a predetermined threshold value. That is, when the level of the difference does not exceed the predetermined threshold value, the utilizable channel decided the last time may continue to be utilized. Thereby, the interaction for the notification to the master WSD 10 of the utilizable channel can be reduced. Note that the determination of this predetermined condition may be performed for each master WSD, or may be performed for the entire master WSD.

<2.2. Flow of Process>

Figure 10:
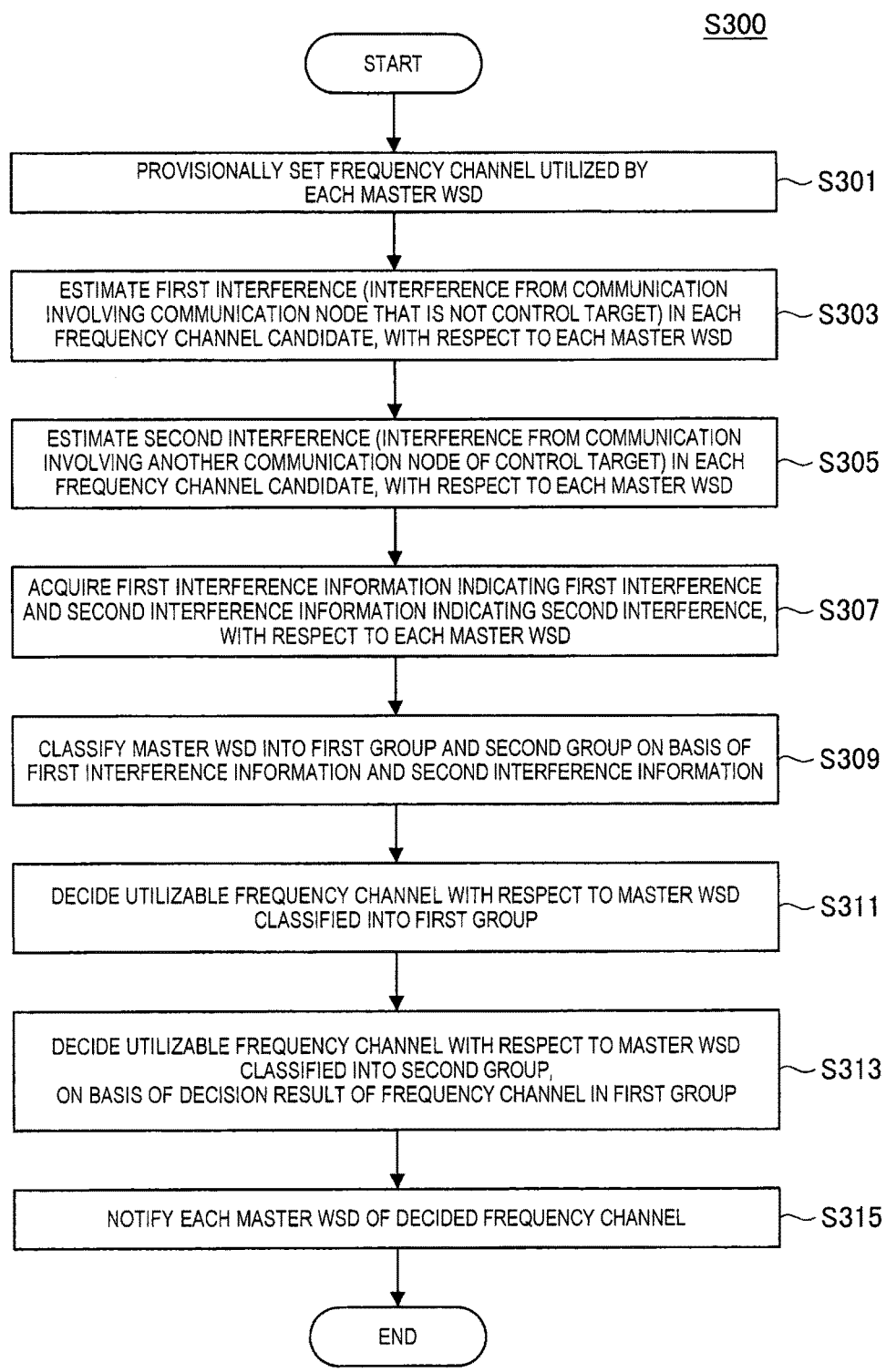
FIG. 10 describes a communication control process according to the first embodiment.

Next, with reference to FIG. 10, a communication control process according to the first embodiment will be described. FIG. 10 is a flowchart illustrating an example of the schematic flow of the communication control process according to the first embodiment. The communication control process can be executed for each set 40 of the master WSDs 10.

First, the interference estimating unit 133 provisionally sets the frequency channel utilized by each of a plurality of master WSDs 10 of control target (S301).

Also, the interference estimating unit 133 estimates the first interference (the interference from communication involving the communication node that is not control target) in each frequency channel candidate, with respect to each of the above plurality of master WSDs 10 (S303).

Also, the interference estimating unit 133 estimates the second interference (the interference from communication involving another communication node of control target) in each frequency channel candidate, with respect to each of the above plurality of master WSDs 10 (S305).

Then, the interference information acquiring unit 135 acquires the first interference information indicating the above first interference and the second interference information indicating the above second interference, with respect to each of the above plurality of master WSDs 10 (S307).

Thereafter, the classifying unit 137 classifies the above plurality of master WSDs 10 into the first group and the second group, on the basis of the above first interference information and the above second interference information with respect to the above plurality of master WSDs 10 (S309).

Also, the channel deciding unit 139 decides the utilizable frequency channel with respect to each of one or more master WSDs 10 classified into the above first group (S311).

Thereafter, the channel deciding unit 139 decides the utilizable frequency channel with respect to each of one or more master WSDs 10 classified into the above second group, on the basis of the decision result of the frequency channel in the above first group (S313). Here, for example, the channel deciding unit 139 first decides the utilizable frequency channel with respect to the master WSD 10 having a smaller level of the above second interference. Then, the channel deciding unit 139 decides the utilizable frequency channel with respect to the master WSD 10 having a larger level of the above second interference, on the basis of the decision result of the utilizable frequency channel with respect to the master WSD 10.

Further, the channel deciding unit 139 notifies each master WSD 10 of the decided utilizable frequency channel via the communication unit 110 (S315). Then, the process ends.

<2.3. First Exemplary Variant>

Next, with reference to FIG. 11, the first exemplary variant of the first embodiment will be described.

(Overview)

As described above, a plurality of groups into which a plurality of master WSDs 10 of control target are classified includes a first group and a second group. Then, the master WSDs 10 classified into the above first group is the master WSD 10 having a larger level of the above first interference relative to the above second interference, as compared with the master WSD 10 classified into the above second group. Then, in the example of the first embodiment described above in particular, the above second group is the group in which the above frequency channels are decided after the above first group.

On the other hand, in the exemplary variant of the first embodiment, the above second group is the group in which the above frequency channels are decided before the above first group. Then, the exemplary variant of the first embodiment also improves communication of a communication node that utilizes a radio resource (frequency channel) under an environment in which there is an interference from communication involving a communication node that is not control target, with less calculation amount.

(Classifying Unit 137)

The classifying unit 137 classifies the above plurality of master WSDs 10 into a plurality of groups related to the decision of the frequency channel that the master WSD 10 is able to utilize, on the basis of the above first interference information and the above second interference information with respect to the above plurality of master WSDs 10 of control target. This point is as described above in the example of the first embodiment.

Also, for example, the above plurality of groups are a plurality of groups corresponding to the order in which the above frequency channels are decided. More specifically, for example, the above plurality of groups, at least the above plurality of groups, include at least the first group and the second group. These points are also as described above in the example of the first embodiment.

Also, for example, the master WSDs 10 classified into the above first group is the master WSD 10 having a larger level of the above first interference relative to the above second interference, as compared with the master WSD 10 classified into the above second group. This point is also as described above in the example of the first embodiment.

Then, in the first exemplary variant in particular, the above second group is the group in which the above frequency channels are decided before the above first group. As one example, the classifying unit 137 classifies the master WSD 10 having a larger level of the above first interference relative to the above second interference among the above plurality of master WSDs 10, into the first group for which the utilizable frequency channels are decided later. Also, the classifying unit 137 classifies the master WSD 10 having a smaller level of the above first interference relative to the above second interference among the above plurality of master WSDs 10, into the second group for which the utilizable frequency channels are first decided.

By this classification, for example, the utilizable frequency channels with respect to the master WSD 10 having a comparatively strong interference in the secondary system relative to the interference from the primary system are decided first. Then, the utilizable frequency channels with respect to the master WSD 10 having a comparatively weak interference in the secondary system relative to the interference from the primary system are decided thereafter.

Hence, after deciding the utilizable frequency channel first with respect to the master WSD 10 having a comparatively strong interference in the secondary system relative to the interference from the primary system, the utilizable frequency channel can be decided with respect to another master WSD, so as to reduce the interference to the communication of the above master WSD 10. Thereby, a more appropriate utilizable frequency channel with respect to each master WSD 10 can be decided in the secondary system. As a result, the communication of the master WSD 10 that secondarily utilizes the frequency channel can be improved.

Also, the utilizable frequency channel is decided in order for each group (i.e., divided utilizable frequency channels with respect to the master WSD 10 are decided in order), and therefore the number of combinations of the master WSD 10 and the frequency channel candidate decreases. As a result, the calculation amount can be reduced.

As described above, communication of a communication node that utilizes a radio resource (frequency channel) under an environment in which there is an interference from communication involving a communication node that is not control target is improved with less calculation amount.

(Channel Deciding Unit 139)

—Decision in Order According to Group

In particular, in the first exemplary variant, the channel deciding unit 139 decides the above frequency channel with respect to each of one or more master WSDs 10 classified into the above second group. Also, the channel deciding unit 139 decides the above frequency channel with respect to each of one or more master WSDs 10 classified into the above first group, on the basis of the decision result of the above frequency channel in the above second group.

—Decision of Frequency Channel in Second Group

In particular, in the first exemplary variant, the channel deciding unit 139 decides the above frequency channel with respect to each of one or more master WSDs 10 classified into the above second group, without using the decision result of the above frequency channel in the above first group. Except this point, it is as described above as the example of the first embodiment.

—Decision of Frequency Channel in First Group

In particular, in the first exemplary variant, as described above, the channel deciding unit 139 decides the above frequency channel with respect to each of one or more master WSDs 10 classified into the above first group, on the basis of the decision result of the above frequency channel in the above second group.

For example, the channel deciding unit 139 decides one or more frequency channel candidates, among the two or more frequency channel candidates, as the above frequency channel with respect to the master WSDs 10 classified into the above first group. Then, the one or more frequency channel candidates is one or more frequency channel candidates having a smaller level of the third interference to the above one or more master WSDs 10 classified into the above second group.

As one example, the above one or more frequency channel candidates having a smaller level of the above third interference are the frequency channel candidates having a smaller maximum level of the level of the third interference to one or more master WSDs 10 than that of other frequency channel candidates.

Note that, as another example, the above one or more frequency channel candidates having a smaller level of the above third interference may be the frequency channel candidates having a smaller summation of the levels of the third interference to one or more master WSDs 10 than that of other frequency channel candidates.

As described above, the frequency channels in the first group is decided. Thereby, for example, the interference in the secondary system can be made smaller, in the master WSD 10 classified into the second group (for example, the master WSD 10 having a comparatively strong interference in the secondary system relative to the interference from the primary system). Hence, the communication quality of the master WSD 10 classified into the second group improves, and the communication of the master WSD can be improved.

(Flow of Process)

Next, with reference to FIG. 11, the communication control process according to the first exemplary variant of the first embodiment will be described. FIG. 11 is a flowchart illustrating an example of the schematic flow of the communication control process according to the first exemplary variant of the first embodiment. The communication control process can be executed for each set 40 of the master WSDs 10.

Figure 11:
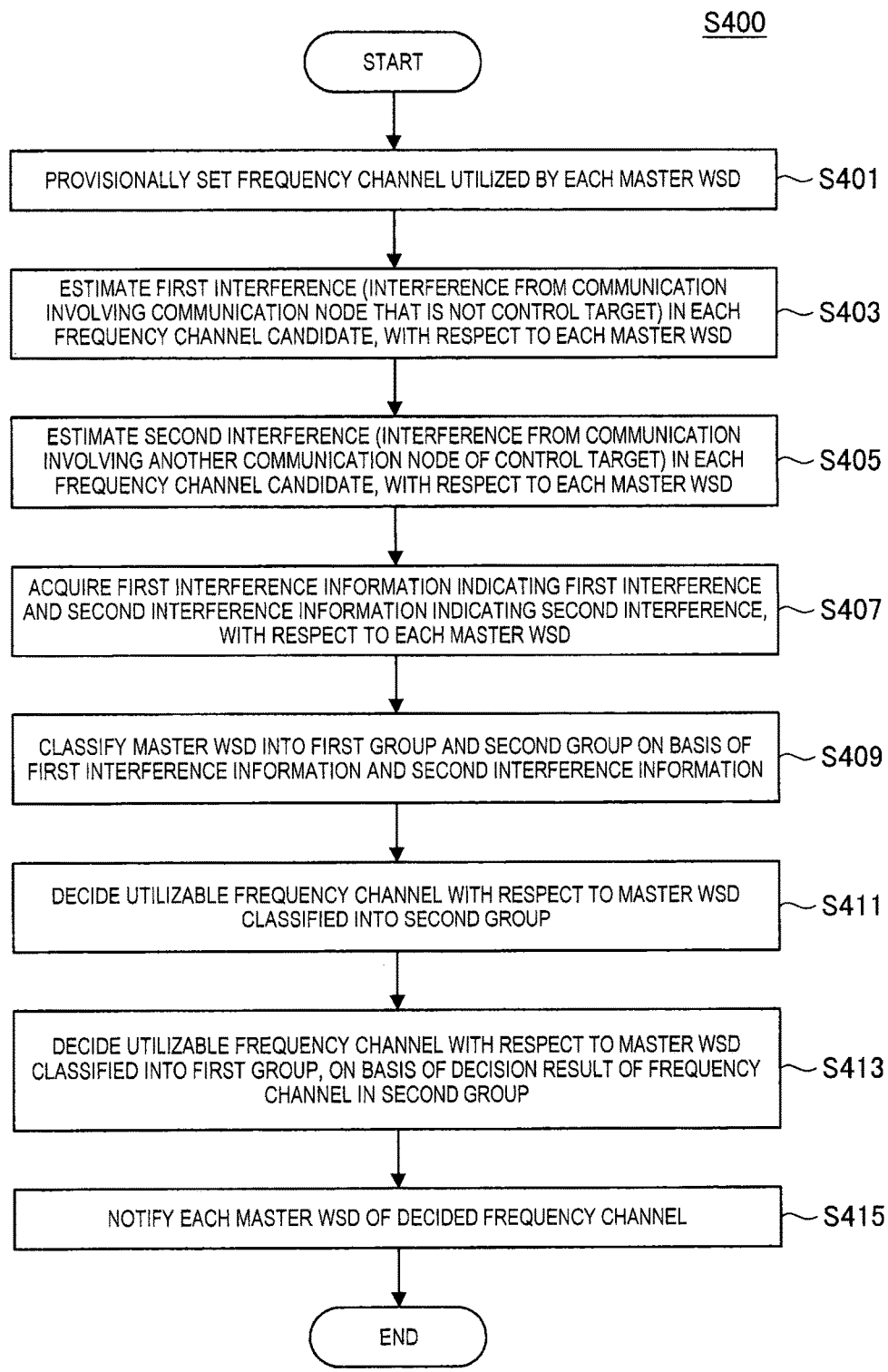
FIG. 11 is a flowchart illustrating an example of a schematic flow of a communication control process according to a first exemplary variant of the first embodiment.

Here, steps S401 to S409 and S415 of an example of the communication control process of the first exemplary variant of the first embodiment described with reference to FIG. 11 are same as steps S301 to S309 and S315 in an example of the communication control process of the first embodiment described with reference to FIG. 10. Thereby, here, only steps S411 and S413 will be described.

Also, the channel deciding unit 139 decides the utilizable frequency channel with respect to each of one or more master WSDs 10 classified into the above second group (S411). Here, for example, the channel deciding unit 139 first decides the utilizable frequency channel with respect to the master WSD 10 having a smaller level of the above second interference. Then, the channel deciding unit 139 decides the utilizable frequency channel with respect to the master WSD 10 having a larger level of the above second interference, on the basis of the decision result of the utilizable frequency channel with respect to the master WSD 10.

Thereafter, the channel deciding unit 139 decides the utilizable frequency channel with respect to each of one or more master WSDs 10 classified into the above first group, on the basis of the decision result of the frequency channels in the above second group (S313). Here, for example, the channel deciding unit 139 decides one or more frequency channel candidates having a smaller level of the third interference to the above one or more master WSDs 10 classified into the above second group, as the utilizable frequency channel with respect to the master WSDs 10 classified into the above first group.

<2.4. Second Exemplary Variant>

Next, with reference to FIG. 12, the second exemplary variant of the first embodiment will be described.

(Overview)

In an example of the above first embodiment, the communication node that is not control target includes the communication node of the primary system. On the other hand, in the second exemplary variant of the first embodiment, the communication node that is not control target further includes another communication node, in addition to the communication node of the primary system.

(Interference Estimating Unit 133)

—First Interference from Communication Involving Communication Node that is not Control Target First, the interference estimating unit 133 estimates a first interference from communication involving the communication node that is not control target, with respect to each of the above plurality of master WSDs 10.

——Communication Node that is not Control Target

For example, the communication node that is not the above control target includes a communication node that is not control target by the communication control device 100-1.

More specifically, for example, the communication node that is not the above control target includes a communication node of the primary system. That is, as an example of the embodiment of the present disclosure, the communication node that is not the above control target includes a transmitter station of the television broadcast system.

In particular, in the second exemplary variant of the first embodiment, the communication node that is not the above control target includes another communication node, in addition to the communication node of the primary system.

As a first example, the above other communication node is another communication node (for example, the master WSD) of the secondary system which is different from the communication system 1. As one example, the other secondary system is the secondary system which is beyond any control by the communication control device 100-1. Also, as another example, the other secondary system is a secondary system of higher priority than the communication system 1.

Also, as a second example, when operated in a certain region where the communication system 1 exists, the above other communication node is a communication node of the communication system operated in a region adjacent to the certain region. As one example, the communication system operated in the other region is a primary system or a secondary system operated in the other region. In the following, with respect to this point, a specific example will be described with reference to FIG. 12.

Figure 12:
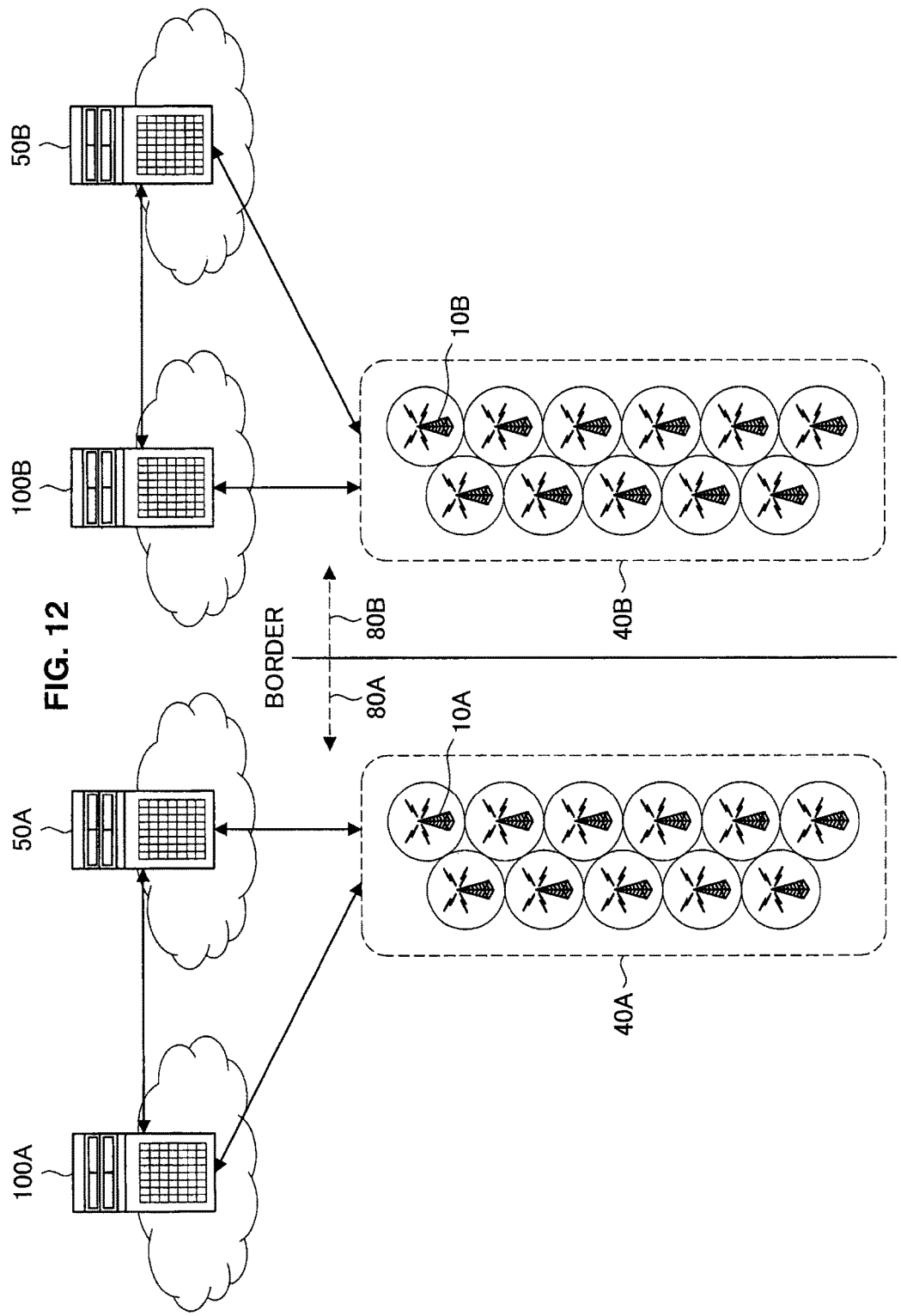
FIG. 12 is an explanatory diagram for describing an example of a communication system operated in another region adjacent to a region in which a communication system is operated.

FIG. 12 is an explanatory diagram for describing an example of the communication system operated in another region adjacent to the region where the communication system 1 is operated. Referring to FIG. 12, the communication system 1 operated in the region 80A and the communication system 1 operated in the region 80B are illustrated. As one example, the region 80A and the region 80B each indicate a country, and the border between the region 80A and the region 80B indicates a border between countries. Also, as another example, the region 80A and the region 80B each indicate an area, and the border between the region 80A and the region 80B indicates a border between the areas. In this example, the master WSD 10B is not a control target by the communication control device 100A. Also, the master WSD 10A is not a control target by the communication control device 100B. Thereby, the interference estimating unit 133 estimates the interference including the interference from the primary system of the region 80A, the interference from the primary system of the region 80B, and the interference from the master WSD 10B of the region 80B, as the first interference.

Also, as a third example, the above other communication node is a yet another communication node.

Note that, for example, the interference estimating unit 133 can estimate the above first interference, by separately estimating the interference from communication involving the communication node of the primary system and the interference from communication involving the above other communication node, and summing the calculated interferences.

As described above, the communication node that is not the above control target includes another communication node, in addition to the communication node of the primary system. Then, the first interference including the interference from communication involving the other communication node is estimated. Thereby, not only the communication node of the primary system, but also the existence of another communication node that is not control target is considered. Thereby, more appropriate utilizable frequency channel can be decided.

<2.5. Third Exemplary Variant>

Next, the third exemplary variant of the first embodiment will be described.

(Overview)

In the example of the above first embodiment, another communication node of control target includes another master WSD 10 of the communication system 1 which is the secondary system. On the other hand, in the third exemplary variant of the first embodiment, another communication node of control target further includes another communication node, in addition to another master WSD 10 of the communication system 1.

(Interference Estimating Unit 133)

—Second Interference from Communication Involving Another Communication Node of Control Target Second, the interference estimating unit 133 estimates the second interference from communication involving another communication node of control target, with respect to each of the above plurality of master WSDs 10 of control target.

——Another Communication Node of Control Target

For example, the above other communication node of control target is a communication node which is control target by the communication control device 100-1.

More specifically, for example, the above other communication node includes another master WSDs 10 that are not the master WSD 10 for which the interference is estimated, among the above plurality of master WSDs 10. As one example, the above other communication node includes another master WSD 10 that is not the master WSD 10 for which the interference is estimated and is included in the same set 40 as the master WSD 10 for which the interference is estimated, among the above plurality of master WSDs 10.

In particular, in the third exemplary variant of the first embodiment, the above other communication node of control target includes another communication node, in addition to the above other master WSD 10 included in the communication system 1.

Specifically, for example, when the communication control device 100 is involved in the decision of the utilizable frequency channel with respect to the communication node included in another communication system other than the communication system 1, the above other communication node includes the above communication node included in the above other communication system.

As one example, when the communication control device 100 decides the utilizable frequency channel with respect to the master WSD included in another secondary system other than the communication system 1, the above other communication node includes the above master WSD included in the above other secondary system.

Note that, referring to FIG. 11 again, the communication control device 100A decides the utilizable frequency channel with respect to the master WSD 10A, and the communication control device 100B decides the utilizable frequency channel with respect to the master WSD 10B. Then, the communication control device 100A and the communication control device 100B cooperate to decide the utilizable frequency channel. In this case, the above other communication node for the communication control device 100A may include the master WSD 10B. Also, the above other communication node for the communication control device 100B may include the master WSD 10A.

As described above, the above other communication node of control target includes another communication node, in addition to another master WSD 10 included in the communication system 1. Then, the second interference including the interference from communication involving the other communication node is estimated. Thereby, not only the master WSD 10 included in the communication system 1, but also the existence of an additional communication node of control target is considered. Thereby, a more appropriate utilizable frequency channel can be decided.

In the above, the first embodiment of the present disclosure has been described. As described above, the first embodiment improves communication of a communication node that utilizes a radio resource (frequency channel) under an environment in which there is an interference from communication involving a communication node that is not control target, with less calculation amount.

3. Second Embodiment

Next, with reference to FIGS. 13 to 16, the second embodiment of the present disclosure will be described. According to the second embodiment of the present disclosure, the interference to the communication involving the high priority master WSD from the communication involving the low priority master WSD is reduced.

<3.1. Overview>

First, with reference to FIG. 13, the overview of the second embodiment of the present disclosure will be described.

In the second embodiment of the present disclosure, the communication system 1 includes a high priority master WSD of higher priority and a low priority master WSD of lower priority. Then, the low priority master WSD is controlled so as not to affect the high priority master WSD. In the following, with respect to this point, a specific example will be described with reference to FIG. 13.

Figure 13:
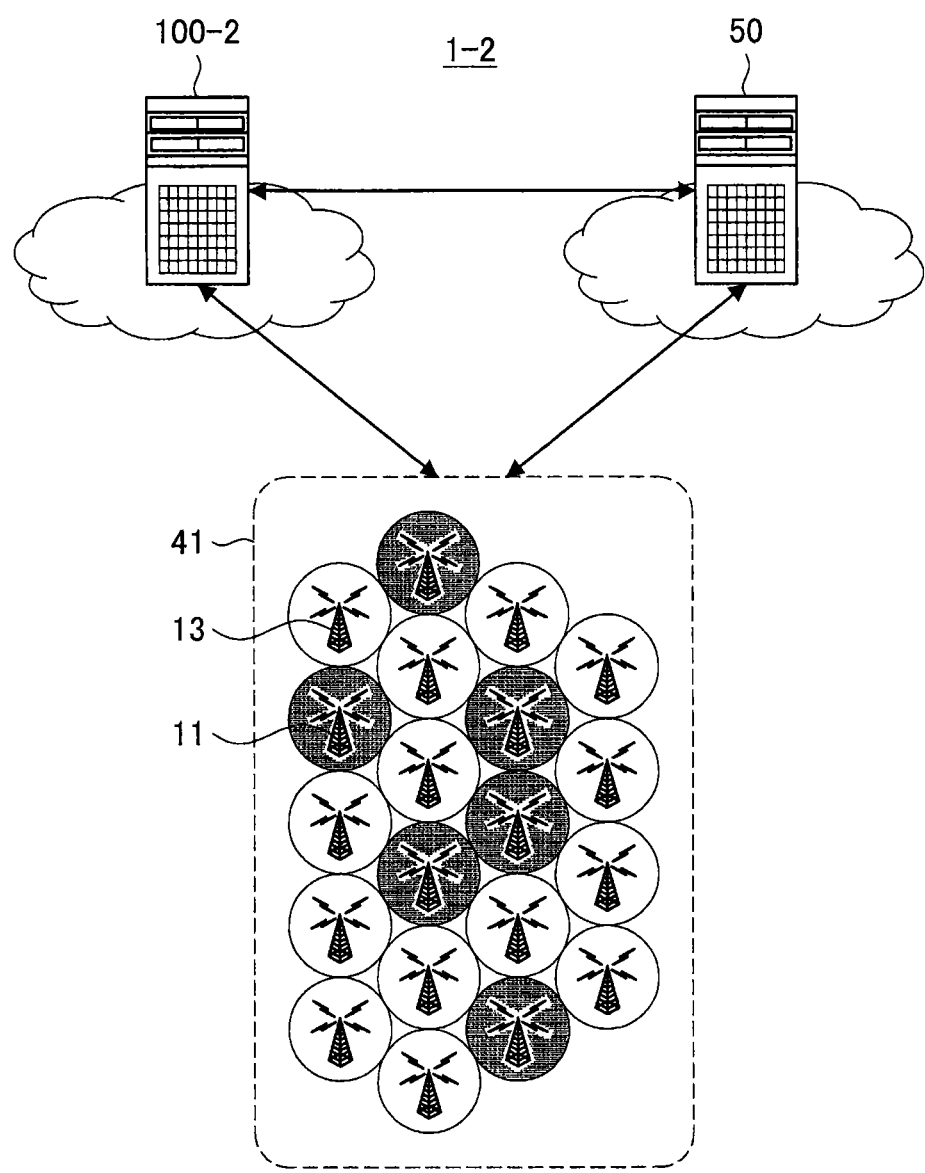
FIG. 13 is an explanatory diagram for describing an example of a master WSD included in a communication system according to a second embodiment.

FIG. 13 is an explanatory diagram for describing an example of the master WSD included in the communication system 1-2 according to the second embodiment. Referring to FIG. 13, the communication system 1-2 according to the second embodiment includes a high priority master WSD 11 of higher priority and a low priority master WSD 13 of lower priority. For example, the high priority master WSD 11 and the low priority master WSD 13 are included in the same set 41. Then, the communication control device 100-2 decides the utilizable frequency channel for each low priority master WSD 13, in such a manner that the communication of the low priority master WSD 13 does not affect the communication of the high priority master WSD 11.

Specifically, in the second embodiment, the utilizable frequency channel with respect to the high priority master WSD 11 is decided first. Thereafter, the utilizable frequency channel with respect to the low priority master WSD 13 is decided on the basis of the decision result of the utilizable frequency channel with respect to the high priority master WSD 11.

<3.2. Function and Configuration of Communication Control Device>

Figure 14:
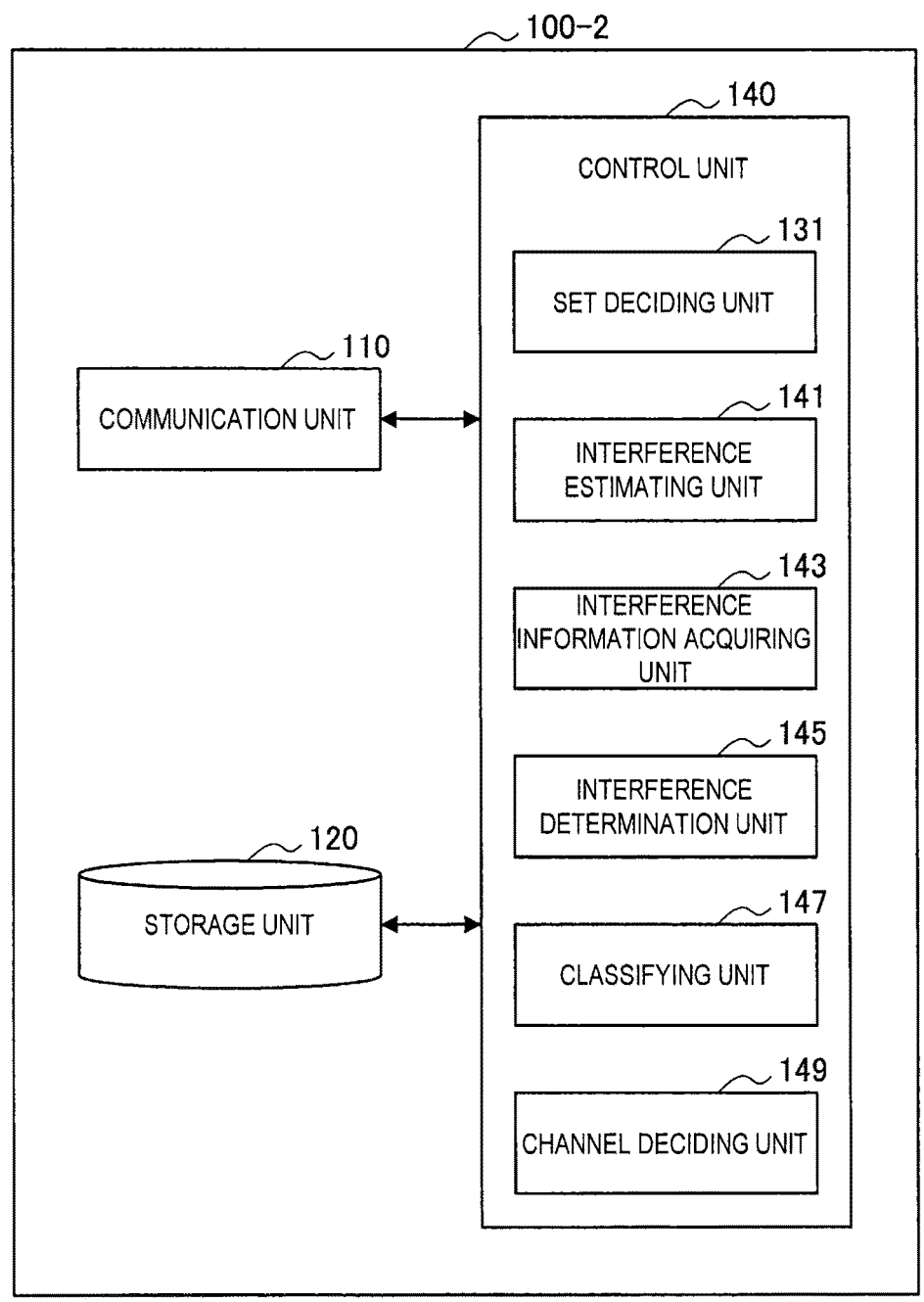
FIG. 14 is a block diagram illustrating an example of a configuration of a communication control device according to the second embodiment.

With reference to FIG. 14, an example of a configuration of a communication control device 100-2 according to the second embodiment will be described. FIG. 14 is a block diagram illustrating an example of the configuration of the communication control device 100-2 according to the second embodiment. Referring to FIG. 14, the communication control device 100-2 includes the communication unit 110, the storage unit 120, and a control unit 140.

Here, with respect to the communication unit 110, the storage unit 120, and the set deciding unit 131 of the control unit 140, there is no difference between the first embodiment and the second embodiment. Thereby, an interference estimating unit 141, an interference information acquiring unit 143, an interference determination unit 145, a classifying unit 147, and a channel deciding unit 149 of the control unit 140 will be described.

(Interference Estimating Unit 141)

The interference estimating unit 141 separately calculates the interference with respect to each of the high priority master WSDs 11 of higher priority, and the interference with respect to the low priority master WSD 13 of lower priority.

—High Priority Master WSD

The interference estimating unit 141 estimates the interference with respect to each of a plurality of high priority master WSDs 11 of control target. For example, the above plurality of high priority master WSDs 11 are high priority master WSDs 11 included in the same set 41, and the interference estimating unit 141 estimates the above interference for each decided set 41.

——First Interference from Communication Involving Communication Node that is not Control Target First, the interference estimating unit 141 estimates the first interference from communication involving the communication node that is not control target, with respect to each of the above plurality of high priority master WSDs 11. The interference estimating unit 141 estimates the first interference with respect to each of the high priority master WSDs 11, in the same way as the interference estimating unit 133 according to the first embodiment.

——Second Interference from Communication Involving Another Communication Node of Control Target Second, the interference estimating unit 141 estimates the second interference from communication involving another communication node of control target, with respect to each of the above plurality of high priority master WSDs 11 of control target.

———Another Communication Node of Control Target

For example, the above other communication node of control target is a communication node which is control target by the communication control device 100-2.

More specifically, in the second embodiment, for example, the above other communication node includes another high priority master WSD 11 other than the high priority master WSD 11 for which the interference is estimated, among the above plurality of high priority master WSDs 11. As one example, the above other communication node includes another high priority master WSD 11 which is not the high priority master WSD 11 for which the interference is estimated but is included in the same set 41 as the high priority master WSD 11 for which the interference is estimated, among the above plurality of high priority master WSDs 11.

Also, in the second embodiment, for example, the above other communication node does not include the low priority master WSD 13 of lower priority.

Note that the content and the estimation method of the second interference are as described in the first embodiment. For example, the second interference with respect to the high priority master WSD 11 is expressed as in the following.

$$P_{I,WSD\_High,n}(f) \qquad \text{[Math. 6]}$$

—Low Priority Master WSD

The interference estimating unit 141 estimates the interference with respect to each of a plurality of low priority master WSDs 13 of control target. For example, the above plurality of low priority master WSDs 13 are low priority master WSDs 13 included in the same set 41, and the interference estimating unit 141 estimates the above interference for each decided set 41.

——First Interference from Communication Involving Communication Node that is not Control Target First, the interference estimating unit 141 estimates the first interference from communication involving the communication node that is not control target, with respect to each of the above plurality of low priority master WSDs 13.

———Communication Node that is not Control Target

For example, the communication node that is not the above control target includes a communication node that is not control target by the communication control device 100-1.

More specifically, for example, the communication node that is not the above control target includes a communication node of the primary system. That is, as an example of the embodiment of the present disclosure, the communication node that is not the above control target includes a transmitter station of the television broadcast system.

Also, in the second embodiment, for example, the communication node that is not the above control target includes the communication node that is beyond control at the time of the decision of the utilizable frequency channel with respect to the low priority master WSD 13, even though it is control target by the communication control device 100-1.

More specifically, for example, the communication node that is not the above control target further includes the high priority master WSD 11.

———Interference

The above first interference is an interference by a downlink signal transmitted by the communication node that is not the above control target or an uplink signal transmitted to the communication node that is not the above control target. For example, the above first interference includes an interference by a downlink signal transmitted by the transmitter station of the television broadcast system. Also, the above first interference includes the interference by the downlink signal transmitted by the high priority WSD 11 or the uplink signal transmitted to the high priority WSD 11.

Also, for example, the above first interference is the interference to the communication involving the low priority master WSD 13. More specifically, the above first interference is the interference to the uplink communication (the transmission to the low priority master WSD 13 from the slave WSD 30), and/or the interference to the downlink communication (the transmission to the slave WSD 30 from the low priority master WSD 13). In other words, the above first interference is the interference to the uplink signal received by the low priority master WSD 13 (the transmission signal of the slave WSD 30), and/or the interference to the downlink signal received by the slave WSD 30 (the transmission signal of the low priority master WSD 13).

As one example, the above first interference is the interference to the uplink communication (i.e., the interference to the uplink signal).

———Estimation of Interference

————Estimation of Interference of Each Frequency Channel Candidate

The interference estimating unit 141 estimates the above first interference in each of two or more frequency channel candidates, with respect to each of the above plurality of low priority master WSDs 13. The two or more frequency channel candidates are the frequency channels that the communication system 1 is able to utilize secondarily, among the frequency channels for the primary system.

————Estimation of Electric Power Value

Also, the interference estimating unit 141 estimates a reception electric power value of the interference signal for example, as the above first interference.

For example, the electric power value of the interference from communication involving the communication node of the primary system (i.e., the reception electric power value of the transmission signal (the interference signal) of the transmitter station of the television broadcast system, in the low priority master WSD 13) is expressed as in the following.

$$P_{I,Primary,n}(f) \qquad \text{[Math. 7]}$$

Also, for example, the electric power value of the interference from communication involving the communication node of the high priority master WSD 11 (i.e., the reception electric power value of the transmission signal of the high priority master WSD 11 or the transmission signal (the interference signal) of the slave WSD 30 that communicates with the high priority master WSD 11, in the low priority master WSD 13) is expressed as in the following.

$$P_{I,WSD\_High,n}(f) \qquad \text{[Math. 8]}$$

Then, in the second embodiment, for example, the first interference is expressed as in the following.

$$P_{I,Primary,n}(f) + P_{I,WSD\_High,n}(f) \qquad \text{[Math. 9]}$$

Here, n represents an index of the low priority master WSD 13 of target for estimating an interference, among the above plurality of low priority master WSDs 13. Also, f represents one frequency channel candidate among a plurality of frequency channel candidates.

Note that the interference estimating unit 141 acquires parameters that are necessary for referring to the information relevant to the primary system, the information relevant to the secondary system, and the interference electric power, from the DB 50 via the communication unit 110, for example. Also, the interference estimating unit 141 acquires the information relevant to the already decided utilizable frequency channel with respect to the high priority master WSD 11. Then, the interference estimating unit 141 estimates the above first interference, on the basis of the acquired information. As described above, the information relevant to the primary system includes the information relevant to the communication node (the transmitter station) of the primary system (e.g., number, position, height of antenna, transmission electric power), for example. Also, as described above, the information relevant to the secondary system includes the information relevant to the master WSD of the secondary system (for example, number, position, height of antenna, transmission electric power), for example.

——Second Interference from Communication Involving Another Communication Node of Control Target Second, the interference estimating unit 141 estimates the second interference from communication involving another communication node of control target, with respect to each of the above plurality of low priority master WSDs 13 of control target.

―――Another Communication Node of Control Target

For example, the above other communication node of control target is a communication node which is control target by the communication control device 100-2.

More specifically, in the second embodiment, for example, the above other communication node includes another low priority master WSD 13 other than the low priority master WSD 13 for which the interference is estimated, among the above plurality of low priority master WSDs 13. As one example, the above other communication node includes another low priority master WSD 13 that is not the low priority master WSD 13 for which the interference is estimated but is included in the same set 41 as the low priority master WSD 13 for which the interference is estimated, among the above plurality of low priority master WSDs 13.

Also, in the second embodiment, for example, the above other communication node does not include the high priority master WSD 11 of higher priority.

Note that the content and the estimation method of the second interference are as described in the first embodiment. For example, the second interference with respect to the low priority master WSD 13 is expressed as in the following.

$$P_{I,WSD\_Low,n}(f) \quad [\text{Math. 10}]$$

Here, n represents an index of the low priority master WSD 13 of target for estimating an interference, among the above plurality of low priority master WSDs 13. Also, f represents one frequency channel candidate among a plurality of frequency channel candidates.

Note that the interference estimating unit 141 acquires the information relevant to the secondary system, from the DB 50, via the communication unit 110, for example. Also, as described above, the interference estimating unit 141 suppositionally sets the information relevant to the slave WSD 30 (position, height of antenna, transmission electric power, etc.). Then, the interference estimating unit 141 estimates the above second interference, on the basis of the acquired information and/or the suppositionally set information. As described above, the information relevant to the secondary system includes the information relevant to the master WSD 10 of the secondary system (for example, number, position, height of antenna, transmission electric power), for example.

(Interference Information Acquiring Unit 143)
―High Priority Master WSD

The interference information acquiring unit 143 acquires the first interference information indicating the first interference from communication involving the communication node that is not control target, with respect to each of a plurality of high priority master WSDs 11 of control target.

Also, the interference information acquiring unit 143 acquires the second interference information indicating the second interference from communication involving another communication node of control target, with respect to each of a plurality of high priority master WSDs 11 of control target.

For example, the interference information acquiring unit 143 acquires, as the first interference information, the information indicating the first interference estimated by the interference estimating unit 141, with respect to each of a plurality of high priority master WSDs 11 of control target. Also, the interference information acquiring unit 143 acquires, as the second interference information, the information indicating the second interference estimated by the interference estimating unit 141, with respect to each of a plurality of high priority master WSDs 11 of control target.

Note that the interference information acquiring unit 143 may acquire, as the first interference information, the information indicating the first interference that is actually observed, instead of the information indicating the first interference estimated by the interference estimating unit 141.

―Low Priority Master WSD

The interference information acquiring unit 143 acquires the first interference information indicating the first interference from communication involving the communication node that is not control target, with respect to each of a plurality of low and high priority master WSDs 13 of control target.

Also, the interference information acquiring unit 143 acquires the second interference information indicating the second interference from communication involving another communication node of control target, with respect to each of a plurality of low and high priority master WSDs 13 of control target.

For example, the interference information acquiring unit 143 acquires, as the first interference information, the information indicating the first interference estimated by the interference estimating unit 141, with respect to each of a plurality of low and high priority master WSDs 13 of control target. Also, the interference information acquiring unit 143 acquires, as the second interference information, the information indicating the second interference estimated by the interference estimating unit 141, with respect to each of a plurality of low and high priority master WSDs 13 of control target.

Note that the interference information acquiring unit 143 may acquire, as the first interference information, the information indicating the first interference that is actually observed, instead of the information indicating the first interference estimated by the interference estimating unit 141.

(Interference Determination Unit 145)

The interference determination unit 145 determines whether a predetermined condition (hereinafter, referred to as "interference condition") with respect to the fourth interference to the communication involving the above plurality of high priority master WSDs 11 is satisfied, with respect to each of the above plurality of low priority master WSDs 13.

―Estimation of Fourth Interference

For example, the interference determination unit 145 estimates the fourth interference to the communication involving the above plurality of high priority master WSDs 11, with respect to each of the above plurality of low priority master WSDs 13.

Specifically, the utilizable frequency channel with respect to the high priority master WSD 11 is decided first. Thereby, the interference determination unit 145 estimates the above fourth interference on the basis of the result of this decision.

Also, for example, the interference determination unit 145 estimates the above fourth interference for each frequency channel, with respect to each of the above plurality of low priority master WSDs 13.

Further, for example, the interference determination unit 145 estimates the fourth interference of each high priority master WSD 11, for each frequency channel candidate.

Also, for example, the interference determination unit 145 estimates the reception electric power value of the interference signal for example, as the above fourth interference. For example, the electric power value of the interference to the communication involving the high priority master WSD 11 from the communication involving the low priority master WSD 13 (i.e., the reception electric power value of the downlink signal from the low priority master WSD 13 and/or the uplink signal (the interference signal) to the low priority master WSD 13, in the high priority master WSD 11) is expressed as in the following.

$$P_{I,Low\_To\_High,n,i}(f) \quad \text{[Math. 11]}$$

Here, n represents an index of the low priority master WSD 13. Also, i represents an index of the high priority master WSD 11. Also, f represents one of the frequency channel candidates among a plurality of frequency channel candidates.

—Determination with Respect to Interference Condition

Then, the interference determination unit 145 determines whether the above interference condition is satisfied, with respect to each of the above plurality of low priority master WSDs 13.

For example, the above interference condition is that the level of the above fourth interference is smaller than a predetermined threshold value. That is, the interference determination unit 145 determines whether the level of the above fourth interference is smaller than the predetermined threshold value, with respect to each of the above plurality of low priority master WSDs 13.

Also, for example, the interference determination unit 145 determines whether the level of the above fourth interference is smaller than the predetermined threshold value, for each frequency channel candidate, with respect to each of the above plurality of low priority master WSDs 13.

As a specific process, for example, the interference determination unit 145 acquires the maximum one among the levels of the above fourth interference as in the following, with respect to each of the above plurality of low priority master WSDs 13.

$$P_{I,Low\_To\_High,n,worst}(f) = \max_{\forall i} P_{I,Low\_To\_High,n,i}(f) \quad \text{[Math. 12]}$$

Then, the interference determination unit 145 performs the following determination, for each frequency channel candidate, with respect to each of the above plurality of low priority master WSDs 13.

$$P_{I,Low\_To\_High,n,worst}(f) < P_{I,th} \quad \text{[Math. 13]}$$

Note that n represents an index of the low priority master WSD 13. F represents one of the frequency channel candidates among a plurality of frequency channel candidates. Also, $P_{I,th}$ represents a predetermined threshold value.

As described above, the interference determination unit 145 determines whether the interference condition for the above fourth interference is satisfied for each frequency channel candidate, with respect to each of the above plurality of low priority master WSDs 13.

(Classifying Unit 147)

The classifying unit 147 classifies a plurality of high priority master WSDs 11 and a plurality of low priority master WSDs 13 in a separated manner. That is, the classifying unit 147 classifies a plurality of high priority master WSDs 11 into a plurality of groups. Also, the classifying unit 147 classifies a plurality of low priority master WSDs 13 into a plurality of groups, independently from a plurality of high priority master WSDs 11. It is to be noted that the high priority master WSD 11 and the low priority master WSD 13 are not mixed in all groups.

—High Priority Master WSD

The classifying unit 147 classifies the above plurality of high priority master WSDs 11 into a plurality of groups related to the decision of the frequency channel that the high priority master WSD 11 is able to utilize, on the basis of the above first interference information and the above second interference information with respect to a plurality of high priority master WSDs 11 of control target. Also, for example, the above plurality of high priority master WSDs 11 are the high priority master WSDs 11 included in the same set 41, and the classifying unit 147 classifies the high priority master WSDs 11 for each decided set 41.

Note that the specific method of the classification is as described in the first embodiment. Specifically, in the second embodiment, for example, the high priority master WSDs 11 are classified as in the following.

$$n \in \begin{cases} G^{1st} & \text{if } \text{card}\{p|P_{I,Primary,n}(f) > P_{I,WSD\_High,n}(f)\}/N_{Channel} > x \\ G^{2nd} & \text{, else} \end{cases} \quad \text{[Math. 14]}$$

Here, n represents an index of the high priority master WSD 11 of the target to be classified, among the above plurality of high priority master WSDs 11. Also, $G^{1st}$ indicates the first group, and $G^{2nd}$ indicates the second group. Also, f represents one frequency channel candidate among a plurality of frequency channel candidates. $N_{channel}$ indicates the number of the frequency channel candidates (i.e., the number of the frequency channels that the communication system 1 is able to utilize). P indicates a set of frequency channels that satisfy $P_{I,Primary,n}(f) > P_{I,WSD\_High,n}(f)$. Then, card { • • • } is the cardinality of the set. When elements of the set is discrete, card { • • • } is equivalent to the number of the elements of the set (i.e., the number of the frequency channel candidates). Also, as described above, x is a threshold value that is larger than 0 and smaller than 1.

—Low Priority Master WSD

The classifying unit 147 classifies the above plurality of low priority master WSDs 13 into a plurality of groups related to the decision of the frequency channel that the low priority master WSD 13 is able to utilize, on the basis of the above first interference information and the above second interference information with respect to a plurality of low priority master WSDs 13 of control target. Also, for example, the above plurality of low priority master WSDs 13 are the low priority master WSDs 13 included in the same set 41, and the classifying unit 147 classifies the low priority master WSDs 13 for each decided set 41.

Also, in the second embodiment, for example, the classifying unit 147 classifies a plurality of low priority master WSDs 13 on the basis of the determination result with respect to the interference condition. For example, the classifying unit 147 excludes the low priority master WSD 13 that does not satisfy the interference condition with respect to any frequency channel candidates from the target of classification, and classifies the low priority master WSD 13 that satisfies the interference condition into a plurality of groups.

Note that the specific method of the classification is as described in the first embodiment. Specifically, in the second embodiment, for example, the low priority master WSD 13 is classified as in the following.

[Math. 15]
$$n \in \begin{cases} G^{1st} & \text{if } \text{card}\{p | P_{I,Primary,n}(f) + P_{I,WSD\_High,n}(f) > \\ & \qquad P_{I,WSD\_Low,n}(f)\}/N_{Channel} > x \\ G^{2nd}, & \text{else} \end{cases}$$

Here, n represents an index of the low priority master WSD 13 of the target to be classified, among the above plurality of low priority master WSDs 13. Also, $G^{1st}$ indicates the first group, and $G^{2nd}$ indicates the second group. Also, f represents one frequency channel candidate among a plurality of frequency channel candidates. $N_{channel}$ indicates the number of the frequency channel candidates (i.e., the number of the frequency channels that the communication system 1 is able to utilize). P indicates a set of frequency channels that satisfy $P_{I,Primary,n}(f)$ $P_{I,WSD\_High,n}(f) > P_{I,WSD\_Low,n}(f)$. Then, card { • • • } is the cardinality of the set. When elements of the set is discrete, card { • • • } is equivalent to the number of the elements of the set (i.e., the number of the frequency channel candidates). Also, as described above, x is a threshold value that is larger than 0 and smaller than 1.

(Channel Deciding Unit 149)

The channel deciding unit 149 decides the utilizable frequency channel with respect to each of a plurality of master WSDs of control target.

—Decision in Order According to Priority

In the second embodiment, the channel deciding unit 149 first decides the utilizable frequency channel with respect to each of a plurality of high priority master WSDs 11 of control target. Then, the channel deciding unit 149 further decides the utilizable frequency channel with respect to each of the above plurality of low priority master WSDs 13, on the basis of the decision result of the utilizable frequency channel with respect to the above plurality of high priority master WSDs 11.

With this decision of the frequency channel, for example, the utilizable frequency channel with respect to the low priority master WSDs 13 can be decided so as to reduce the interference to the communication of the high priority master WSD 11. As a result, the interference to the communication involving the high priority master WSD from the communication involving the low priority master WSD, from the communication involving the low priority master WSD, can be reduced.

—High Priority Master WSD

The channel deciding unit 149 decides the utilizable frequency channel with respect to each of a plurality of high priority master WSDs 11 of control target.

Note that the specific method of the decision is as described in the first embodiment. The channel deciding unit 149 decides the utilizable frequency channel with respect to each of the high priority master WSDs 11, for each group.

—Low Priority Master WSD

The channel deciding unit 149 decides the utilizable frequency channel with respect to each of a plurality of low priority master WSDs 13 of control target.

——Decision of Frequency Channel Based on Determination Result with Respect to Interference Condition Also, in the second embodiment, for example, the channel deciding unit 149 decides the utilizable frequency channel with respect to each of the above plurality of low priority master WSDs 13, on the basis of the determination result with respect to the interference condition.

For example, the channel deciding unit 149 decides that there is no utilizable frequency channel, with respect to the low priority master WSD 13 that does not satisfy the interference condition in any frequency channel candidates.

Also, for example, the channel deciding unit 149 decides one of the utilizable frequency channel, with respect to the low priority master WSD 13 that satisfies the interference condition in one of the frequency channel candidates. Specifically, for example, with respect to such a low priority master WSD 13, the channel deciding unit 149 decides one of the frequency channel candidates in which the interference condition is satisfied, as the utilizable frequency channel.

As one example, the channel deciding unit 149 decides the utilizable frequency channel with respect to each of the low priority master WSD 13, for each group, in the same way as the method of the decision described in the first embodiment. Note that, as described above, instead of all frequency channel candidates, one of the frequency channel candidates is decided as the utilizable frequency channel from among the frequency channel candidates in which the interference condition is satisfied.

Also, as another example, the channel deciding unit 149 may decide the frequency channel candidate in which the interference condition is satisfied, as the utilizable frequency channel, not for each group, but with respect to each low priority master WSD 13.

As described above, the interference to the communication involving the high priority master WSD from the communication involving the low priority master WSD, from the communication involving the low priority master WSD, can be reduced by the decision based on the determination result with respect to the interference condition.

As described above, the channel deciding unit 149 decides the utilizable frequency channel with respect to each master WSD of control target. For example, thereafter, the channel deciding unit 149 notifies each master WSD of the decided utilizable frequency channel, via the communication unit 110.

In the above, the function and configuration of the communication control device 100-2 according to the second embodiment has been described. Note that the hardware configuration of the communication control device 100-2 according to the second embodiment is same as the hardware configuration of the communication control device 100-1 according to the first embodiment.

<3.3. Flow of Process>

Next, with reference to FIGS. 15 and 16, the communication control process according to the second embodiment will be described.

(Overall Flow)

Figure 15:
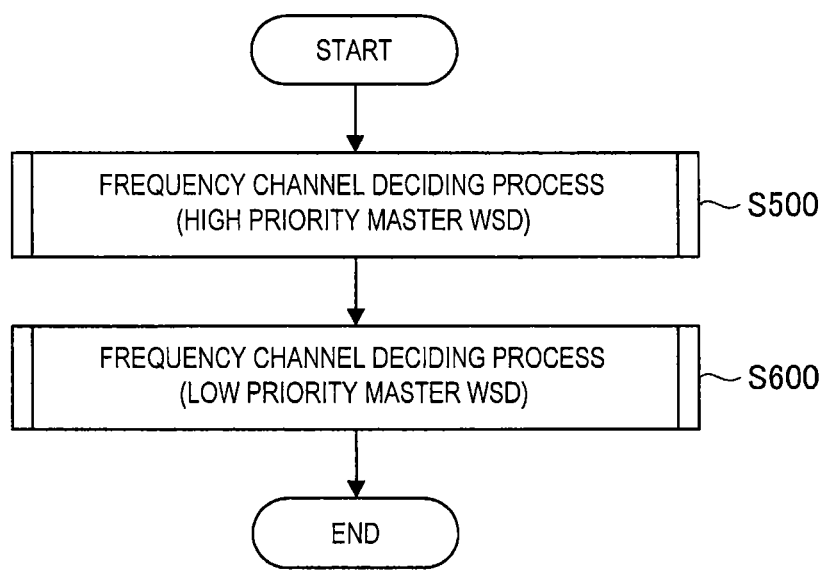
FIG. 15 is a flowchart illustrating an example of a schematic flow of a communication control process according to the second embodiment.

FIG. 15 is a flowchart illustrating an example of the schematic flow of the communication control process according to the second embodiment. The communication control process can be executed for each set 41 of the master WSDs.

First, the control unit 140 executes the frequency channel deciding process with respect to the high priority master WSD 11 (S500).

Thereafter, the control unit 150 executes the frequency channel deciding process with respect to the low priority master WSD 13 (S600).

Note that the frequency channel deciding process (S500) with respect to the high priority master WSD 11 is same as the communication control process (S300) of the first embodiment described with reference to FIG. 10.

(Overall Flow)

Figure 16:
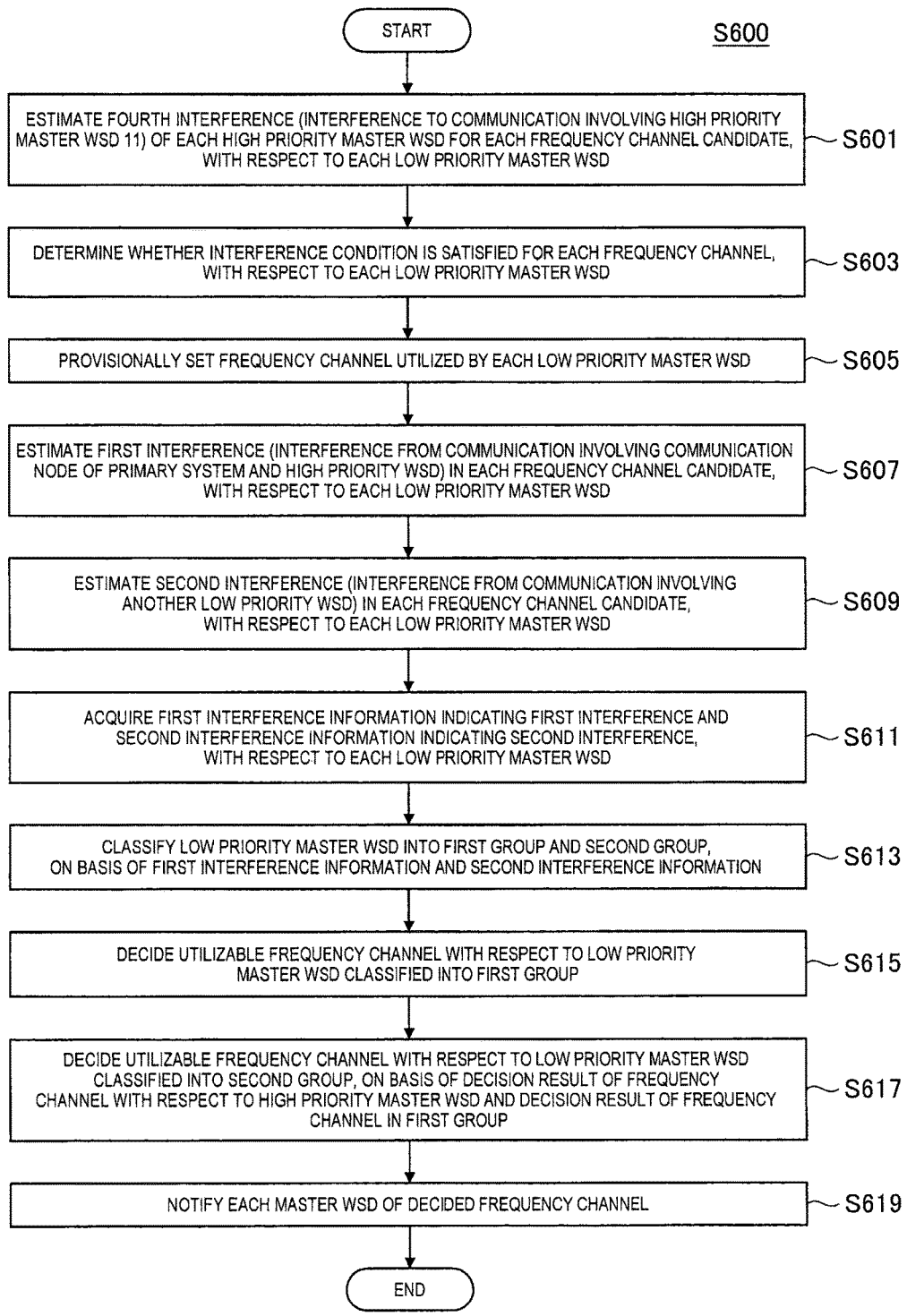
FIG. 16 is a flowchart illustrating an example of a schematic flow of a frequency channel deciding process with respect to a low priority master WSD.

FIG. 16 is a flowchart illustrating an example of the schematic flow of the frequency channel deciding process (S600) with respect to the low priority master WSD 13.

First, the interference determination unit 145 estimates the fourth interference (the interference to the communication involving the high priority master WSD 11) of each high priority master WSD 11, for each frequency channel, with respect to each of a plurality of low priority master WSDs 13 of control target (S601).

Thereafter, the interference determination unit 145, the interference determination unit 145 determines whether the interference condition is satisfied, with respect to each of the above plurality of low priority master WSDs 13 (S603).

The interference estimating unit 141 provisionally sets the frequency channel utilized by each of the low priority master WSDs 13 (S605).

Also, the interference estimating unit 141 estimates the first interference (the interference from the communication involving the communication node of the primary system and the communication involving the high priority master WSD 11) in each frequency channel candidate, with respect to each of the above plurality of low priority master WSDs 13 (S607).

Also, the interference estimating unit 141 estimates the second interference (the interference from communication involving another low priority master WSD 13) in each frequency channel candidate, with respect to each of the above plurality of low priority master WSDs 13 (S609).

Then, the interference information acquiring unit 143 acquires the first interference information indicating the above first interference and the second interference information indicating the above second interference, with respect to each of the above plurality of low priority master WSDs 13 (S611).

Thereafter, the classifying unit 147 classifies the above plurality of low priority master WSDs 13 into the first group and the second group, on the basis of the above first interference information and the above second interference information with respect to the above plurality of low priority master WSDs 13 (S613).

Also, the channel deciding unit 149 decides the utilizable frequency channel with respect to each of one or more low priority master WSDs 13 classified into the above first group (S615).

Thereafter, the channel deciding unit 149 decides the utilizable frequency channel with respect to each of one or more low priority master WSDs 13 classified into the above second group, on the basis of the decision result of the frequency channel with respect to the high priority master WSD 11 and the decision result of the frequency channel in the above first group (S617).

Further, the channel deciding unit 149 notifies each master WSD of the decided utilizable frequency channel via the communication unit 110 (S619). Then, the process ends.

In the above, the second embodiment of the present disclosure has been described. Note that the same transformation as each exemplary variant (the first exemplary variant, the second exemplary variant, and the third exemplary variant) of the first embodiment may be applied to the second embodiment.

4. Application Example

Next, with reference to FIG. 17, an application example of the embodiment of the present disclosure will be described.

In the example of the above embodiment, the communication system 1 is the secondary system that secondarily utilizes the frequency channel (TVWS) of the primary system. Then, the communication node that is not control target includes the communication node (the transmitter station) of the primary system (the television broadcast system). Also, each of a plurality of communication nodes of control target is the communication node (the master WSD) of the secondary system that secondarily utilizes the frequency channel for the above primary system.

However, the embodiment of the present disclosure is not limited to such an example. For example, as an application example of the embodiment of the present disclosure, the communication system 1 is a communication system relevant to mobile communication. Also, the communication node that is not control target includes a base station of macro cell. Also, each of a plurality of communication nodes of control target is a base station of small cell that partially or entirely overlaps the above macro cell. In the following, with respect to this point, a specific example will be described with reference to FIG. 17.

Figure 17:
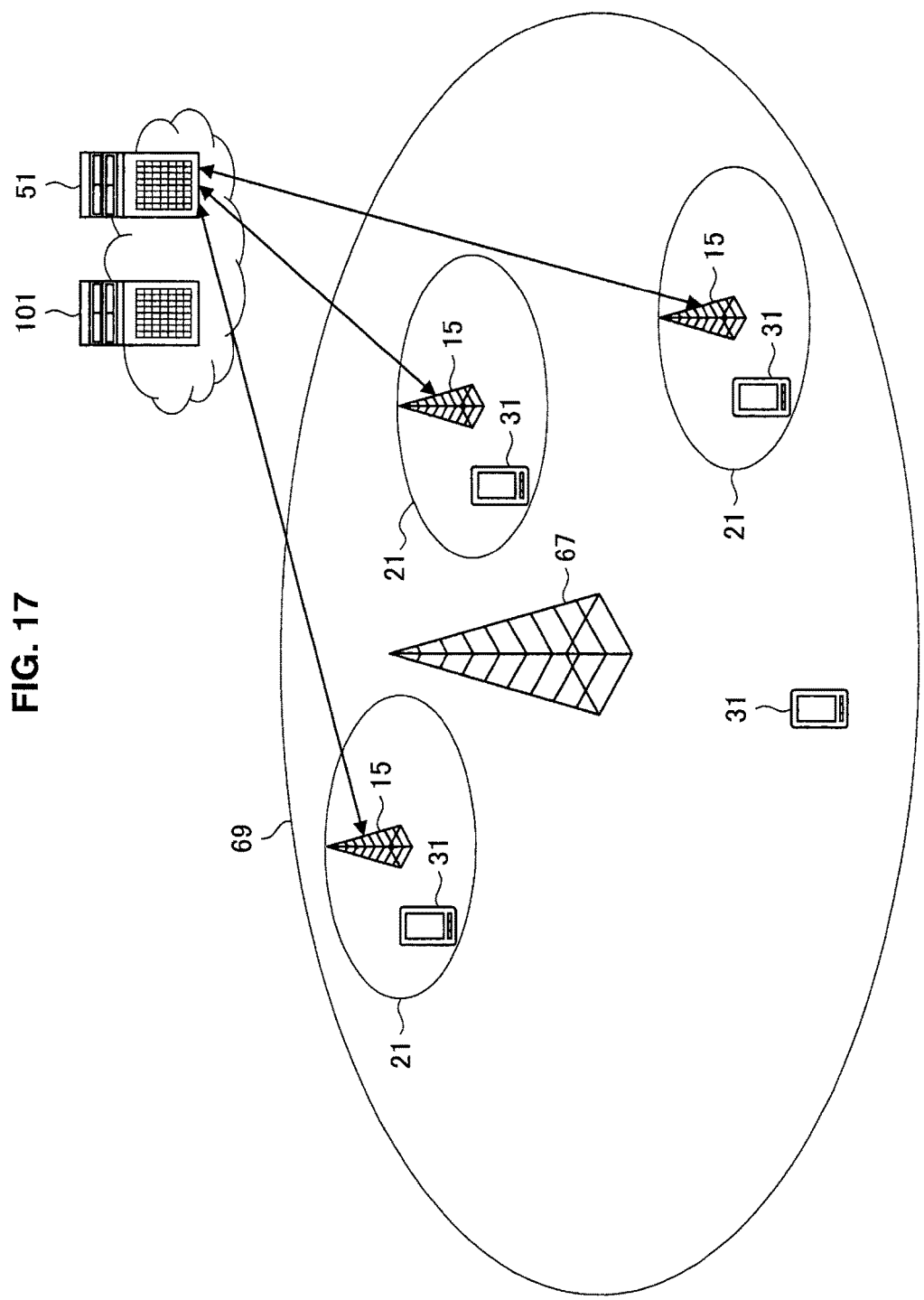
FIG. 17 is an explanatory diagram for describing an application example of an embodiment of the present disclosure.

FIG. 17 is an explanatory diagram for describing an application example of the embodiment of the present disclosure. Referring to FIG. 17, a base station 67 of a macro cell 69, base stations 15 of a small cells 21, and terminal devices 31 that are able to communicate with the base stations are illustrated. Also, the DB 51 and the communication control device 101 are illustrated.

In this example, the base station 15 of the small cell 21 communicates wirelessly by utilizing the frequency channel for the base station 67 of the macro cell 69.

Also, the DB 51 collects and retains various information. For example, the DB 51 collects and retains various types of information for deciding the utilizable frequency channel with respect to the base station 15 of each small cell 21. Specifically, for example, the DB 51 collects the information relevant to the base station 67 of the macro cell 69. Also, for example, the DB 51 collects the information relevant to the base station 15 of the small cell 21. Also, for example, the DB 50 acquires the parameters necessary for referring to the interference electric power.

The communication control device 101 executes various processes relevant to the control of the base station 15 of the small cell 21. For example, the processes includes a process relevant to decision of the utilizable frequency channel with respect to each base station 15. Note that the communication control device 101 can operate in the same way as the communication control device 100 of the above each embodiment. Also, the communication control device 101 can include the same components (for example, the interference information acquiring unit, the classifying unit, the channel deciding unit, and the interference determination unit, and others) as the communication control device 100 of the above each embodiment.

5. Specific Example of Communication Control Device

The technology according to the present disclosure can be applied to various products. For example, the communication control device 100 (and the communication control device 101) may be configured as a server of a type such as a tower server, a rack server, or a blade server. Also, components of at least a part of the communication control device 100 (and the communication control device 101) may be configured as a module mounted on a server (for example, an integrated circuit module configured by one die, or a card or blade inserted into a slot of a blade server).

Figure 18:
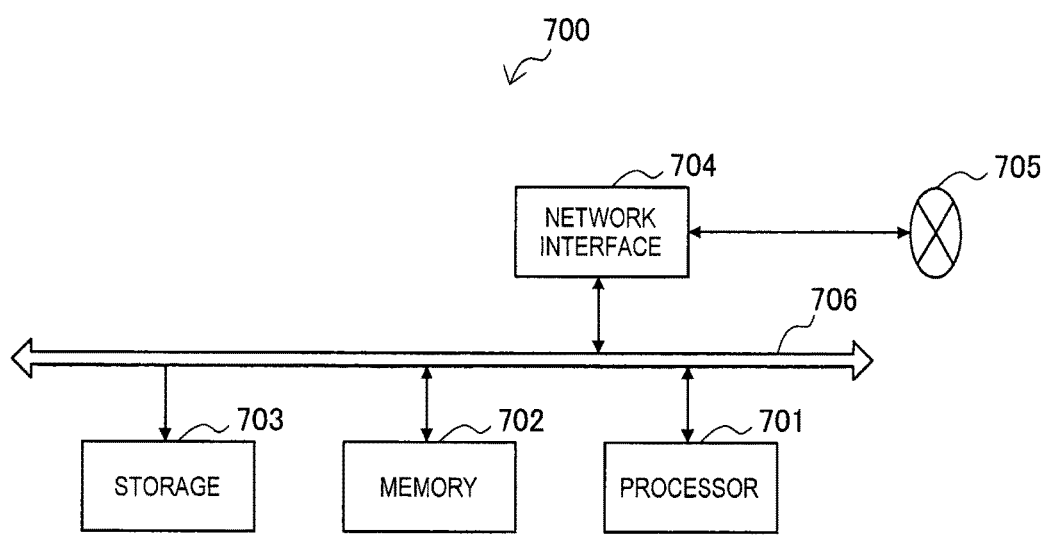
FIG. 18 is a block diagram illustrating an example of a schematic configuration of a server.

FIG. 18 is a block diagram illustrating an example of the schematic configuration of a server 700 to which the technology according to the present disclosure can be applied. The server 700 includes a processor 701, a memory 702, a storage 703, a network interface 704, and a bus 706.

The processor 701 is a central processing unit (CPU) or a digital signal processor (DSP) for example, and controls various types of functions of the server 700. The memory 702 includes a random access memory (RAM) and a read only memory (ROM), and stores programs and data executed by the processor 701. The storage 703 can include a storage medium, such as a semiconductor memory or a hard disk.

The network interface 704 is a wired communication interface for connecting the server 700 to a wired communication network 705. The wired communication network 705 may be a core network such as an evolved packet core (EPC), or may be a packet data network (PDN) such as the Internet.

The bus 706 connects the processor 701, the memory 702, the storage 703, and the network interface 704 to each other. The bus 706 may include two or more buses of different speeds (for example, a high-speed bus and a low-speed bus).

In the server 700 illustrated in FIG. 18, the interference information acquiring unit 135, the classifying unit 137, and/or the channel deciding unit 139 described with reference to FIG. 7 may be implemented on the processor 701. As one example, a program for causing a processor to function as the interference information acquiring unit 135, the classifying unit 137, and/or the channel deciding unit 139 (in other words, a program for causing a processor to execute the operation of the interference information acquiring unit 135, the classifying unit 137, and/or the channel deciding unit 139) may be installed in the server 700, in order for the processor 701 to execute the program. As another example, the server 700 is equipped with a module including the processor 701 and the memory 702 (for example, an information processing apparatus), and the interference information acquiring unit 135, the classifying unit 137, and/or the channel deciding unit 139 may be implemented in the module. In this case, the above module may store a program for causing a processor to function as the interference information acquiring unit 135, the classifying unit 137, and/or the channel deciding unit 139 in the memory 702, in order for the processor 701 to execute the program. As described above, the server 700 or the above module may be provided as the device including the interference information acquiring unit 135, the classifying unit 137, and/or the channel deciding unit 139, or alternatively the above program for causing a processor to function as the interference information acquiring unit 135, the classifying unit 137, and/or the channel deciding unit 139 may be provided. Also, a readable storage medium that can store the above program may be provided. With respect to these points, the interference information acquiring unit 143, the interference determination unit 145, the classifying unit 147, and/or the channel deciding unit 149 described with reference to FIG. 14 are also same as the interference information acquiring unit 135, the classifying unit 137, and/or the channel deciding unit 139.

6. Conclusion

The communication control device and each process according to the embodiments of the present disclosure have been described so far, using FIGS. 1 to 18. According to the embodiments according to the present disclosure, the first interference information indicating the first interference from communication involving the communication node that is not control target is acquired with respect to each of a plurality of communication nodes of control target. Also, the second interference information indicating the second interference from communication involving another communication node of control target is acquired, with respect to each of a plurality of communication nodes of control target. Then, the above plurality of the communication nodes are classified into a plurality of groups related to the decision of the frequency channel that the communication node is able to utilize, on the basis of the above first interference information and the above second interference information.

Thereby, communication of a communication node that utilizes a radio resource (frequency channel) under an environment in which there is an interference from communication involving a communication node that is not control target is improved with less calculation amount.

Also, for example, the above plurality of groups are a plurality of groups corresponding to the order in which the above frequency channels are decided. More specifically, for example, the above plurality of groups include at least the first group and the second group. Above Also, for example, the communication node classified into the above first group is the communication node having a larger level of the above first interference relative to the above second interference, as compared with the communication node classified into the above second group.

Also, for example, the above second group is the group in which the above frequency channels are decided after the above first group.

By this classification, for example, the utilizable frequency channels with respect to the master WSD 10 having a comparatively weak interference in the secondary system relative to the interference from the primary system are decided first. Then, the utilizable frequency channels with respect to the master WSD 10 having a comparatively strong interference in the secondary system relative to the interference from the primary system are decided thereafter. That is, the utilizable frequency channels with respect to the master WSD 10 having a smaller influence on the interference by the decision of the utilizable frequency channels in the secondary system (for example, the fluctuation of the interference level) are decided first. Then, the utilizable frequency channels with respect to the master WSD 10 having a larger influence on the interference by the decision of the utilizable frequency channel in the secondary system (for example, the fluctuation of the interference level) are decided thereafter.

Hence, a more appropriate utilizable frequency channel is decided with respect to the master WSD 10 having a larger influence of the decision of the utilizable frequency channel in the secondary system, in consideration of the utilizable frequency channels that are already decided with respect to other master WSDs 10. On the other hand, with respect to the master WSD 10 having a smaller influence of the decision of the utilizable frequency channel in the secondary system, the influence (for example, the fluctuation of the interference level) occurs by the following decision of the utilizable frequency channel with respect to other master WSDs 10, but the influence is small. Thereby, a more appropriate utilizable frequency channel with respect to each master WSD 10 can be decided in the secondary system. As a result, the communication of the master WSD 10 that secondarily utilizes the frequency channel can be improved.

Also, the utilizable frequency channel is decided in order for each group (i.e., divided utilizable frequency channels with respect to the master WSD 10 are decided in order), and therefore the number of combinations of the master WSD 10 and the frequency channel candidate decreases. As a result, the calculation amount can be reduced.

Further, for example, of the two or more frequency channel candidates, one or more frequency channel candidates having a smaller level of the above first interference are decided as the utilizable frequency channel with respect to the master WSDs 10 classified into the above first group.

This decision of the frequency channel reduces the interference from the primary system in the master WSD 10 classified into the first group (for example, the master WSD 10 having a comparatively strong interference from the primary system relative to the interference in the secondary system), for example. Hence, the communication quality of the master WSD 10 classified into the first group improves, and the communication of the master WSD can be improved. Note that this decision is effective, in particular when there is a variation in the level of the interference from the primary system by the frequency channel candidate.

Also, the above second group may be the group in which the above frequency channels are decided before the above first group.

By this classification, for example, the utilizable frequency channels with respect to the master WSD 10 having a comparatively strong interference in the secondary system relative to the interference from the primary system are decided first. Then, the utilizable frequency channels with respect to the master WSD 10 having a comparatively weak interference in the secondary system relative to the interference from the primary system are decided thereafter.

Hence, after deciding the utilizable frequency channel first with respect to the master WSD 10 having a comparatively strong interference in the secondary system relative to the interference from the primary system, the utilizable frequency channel can be decided with respect to another master WSD, so as to reduce the interference to the communication of the above master WSD 10. Thereby, a more appropriate utilizable frequency channel with respect to each master WSD 10 can be decided in the secondary system. As a result, the communication of the master WSD 10 that secondarily utilizes the frequency channel can be improved.

Also, the utilizable frequency channel is decided in order for each group (i.e., divided utilizable frequency channels with respect to the master WSD 10 are decided in order), and therefore the number of combinations of the master WSD 10 and the frequency channel candidate decreases. As a result, the calculation amount can be reduced.

Further, one or more frequency channel candidates having a smaller level of the third interference to the above one or more master WSDs 10 classified into the above second group may be decided as the above frequency channels with respect to the master WSDs 10 classified into the above first group.

Thereby, for example, the interference in the secondary system can be made smaller, in the master WSD 10 classified into the second group (for example, the master WSD 10 having a comparatively strong interference in the secondary system relative to the interference from the primary system). Hence, the communication quality of the master WSD 10 classified into the second group improves, and the communication of the master WSD can be improved.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, although an example in which the secondarily utilized radio resource is the frequency channel has been described, the present disclosure is not limited to such an example. The radio resource may be radio resources other than the frequency channel. For example, the above radio resource may be spreading codes, when code division multiple access (CDMA), wideband code division multiple access (WCDMA) (registered trademark), or a similar method is employed.

Also, although an example in which the communication node (the master WSD) is classified into two groups has been described, the present disclosure is not limited to such an example. For example, the communication node (the master WSD) may be classified into three or more groups. For example, the utilizable frequency channel may be decided in order in each group.

Also, although an example in which a high priority communication node (a high priority master WSD) and a low priority communication node (a low priority master WSD) exist has been described, the present disclosure is not limited to such an example. For example, a high priority communication node (a high priority master WSD), an intermediate priority communication node (an intermediate priority master WSD), and a low priority communication node (a low priority master WSD) may exist. Also, further various types of priorities may be provided. In this case, for example, the utilizable frequency channel may be decided in order from the communication node having a higher priority. Then, the utilizable frequency channel with respect to the communication node having a lower priority may be decided on the basis of the decision result of the utilizable frequency channel with respect to the communication node having a higher priority.

Also, although an example in which the communication control device uses a specific decision method of the utilizable frequency channel has been described, the present disclosure is not limited to such an example. For example, the communication control device may selectively combine and use the above specific decision method and other methods. As one example, when the number of combinations of the communication node (the master WSD) and the frequency channel candidate is large, the above specific decision method may be used, and when the number of combinations is small, another method may be used. The other method may be full search, greedy algorithm, local search, genetic algorithm, or the like, for example. Also, the full search, the greedy algorithm, the local search, the genetic algorithm, or the like may be used for each group.

Also, although an example in which the primary system is the television broadcast system, and the secondary system is the communication system that secondarily utilizes the TVWS has been described, the present disclosure is not limited to such an example. The primary system and the secondary system may be the primary system and the secondary system of other types.

Also, although an example in which the communication control device is an independent device has been described, the present disclosure is not limited to such an example. The communication control device may be implemented in another device. As one example, the communication control device may be implemented in the DB. Also, as another example, the communication control device may be implemented in the regulatory DB. In this case, the regulatory DB may also collect various types of information from the master WSD, the DB, and others. Also, as yet another example, the communication control device may be implemented in the master WSD. In this case, as one example, the master WSD may execute the classification of a plurality of master WSDs to a plurality of groups, the decision of the utilizable radio resource (the frequency channel), or other processing, as a representative. Also, as another example, the master WSD may control a plurality of communication nodes that are dependent on the master WSD and execute the classification of the plurality of communication nodes to the groups, the decision of the utilizable radio resource (the frequency channel), or other processing.

Also, although an example in which one communication control device and one DB control one region has been described, the present disclosure is not limited to such an example. For example, one communication control device and/or one DB may control a plurality of regions. Also, a plurality of communication control devices and/or a plurality of DBs may control one region.

Also, the process steps in the communication control process of the present specification are needless to be executed in temporal sequence along the order described in the flowchart. For example, the process steps in the communication control process may be executed in a different order from the order described in the flowchart, or may be executed in parallel.

Also, a computer program for causing the processor equipped in the communication control device of the present specification (for example, CPU, DSP, or the like) to function as the components of the above communication control device (for example, the interference information acquiring unit, the classifying unit, the channel deciding unit, and/or the interference determination unit) (in other words, a computer program for causing the above processor to execute the operation of the components of the above communication control device) can be created. Also, a storage medium that stores the computer program may be provided. Also, an information processing apparatus (for example, a completed product or a module (a component, a processing circuit, or a chip, for example) for the completed product) including a memory that stores the above computer program and one or more processors capable of executing the above computer program may be provided. Also, a method including the operation of the components (for example, the interference information acquiring unit, the classifying unit, the channel deciding unit, and/or the interference determination unit, for example) of the above communication control device is included in the technology according to the present disclosure.

Additionally, the present technology may also be configured as below.

(1)

A communication control device including:

an acquisition unit configured to acquire first interference information indicating a first interference from communication involving a communication node that is not control target and second interference information indicating a second interference from communication involving another communication node of control target, with respect to each of a plurality of communication nodes of control target; and a classifying unit configured to classify the plurality of communication nodes into a plurality of groups related to a decision of a radio resource that a communication node is able to utilize, on the basis of the first interference information and the second interference information with respect to the plurality of communication nodes.

(2)

The communication control device according to (1), wherein the plurality of groups are a plurality of groups corresponding to an order in which the radio resource is decided.

(3)

The communication control device according to (2), wherein the plurality of groups include at least a first group and a second group, and a communication node classified into the first group is a communication node in which a level of the first interference relative to the second interference is larger, as compared with a communication node classified into the second group.

(4)

The communication control device according to (3), wherein the second group is a group for which the radio resource is decided after the first group.

(5)

The communication control device according to (4), further including:

a deciding unit configured to decide the radio resource with respect to each of the plurality of communication nodes, wherein the deciding unit decides the radio resource with respect to each of one or more communication nodes classified into the first group, and decides the radio resource with respect to each of one or more communication nodes classified into the second group, on the basis of a decision result of the radio resource in the first group.

(6)

The communication control device according to (5), wherein the deciding unit decides one or more radio resource candidates having a smaller level of the first interference among two or more radio resource candidates, as the radio resource for the communication node classified into the first group.

(7)

The communication control device according to (3), wherein the second group is a group for which the radio resource is decided before the first group.

(8)

The communication control device according to (7), further including:

a deciding unit configured to decide the radio resource with respect to each of the plurality of communication nodes, wherein the deciding unit decides the radio resource with respect to each of one or more communication nodes classified into the second group, and decides the radio resource with respect to each of one or more communication nodes classified into the first group, on the basis of a decision result of the radio resource in the second group.

(9)

The communication control device according to (8), wherein the deciding unit decides one or more radio resource candidates having a smaller level of a third interference with the one or more communication nodes classified into the second group among two or more radio resource candidates, as the radio resource for the communication node classified into the first group.

(10)

The communication control device according to any one of (3) to (9), further including:

a deciding unit configured to decide the radio resource with respect to each of the plurality of communication nodes, wherein, when deciding the radio resource with respect to each of the one or more communication nodes classified into the second group, the deciding unit decides the radio resource with respect to the communication node having a smaller level of the second interference, and decides, on the basis of a decision result of the radio resource with respect to the communication node, the radio resource with respect to the communication node having a larger level of the second interference.

(11)

The communication control device according to any one of (3) to (10), further including:

a deciding unit configured to decide the radio resource with respect to each of the plurality of communication nodes, wherein the deciding unit decides one or more radio resource candidates having a smaller level of interference including the first interference and the second interference among two or more radio resource candidates, as the radio resource for the communication node classified into the second group.

(12)

The communication control device according to any one of (3) to (11), wherein the first interference information indicates the first interference in each of two or more radio resource candidates, the second interference information indicates the second interference in each of the two or more radio resource candidates, and the level of the first interference relative to the second interference corresponds to the number of the radio resource candidates for which a level of the first interference is larger than a level of the second interference by a predetermined threshold value or more.

(13)

The communication control device according to any one of (1) to (13), further including:

a deciding unit configured to decide the radio resource with respect to each of the plurality of communication nodes, wherein the plurality of communication nodes are communication nodes of a higher priority than one or more low priority communication nodes of control target, and the deciding unit further decides the radio resource with respect to each of the one or more low priority communication nodes, on the basis of a decision result of the radio resource with respect to the plurality of communication nodes.

(14)

The communication control device according to (13), further including:

a determination unit configured to determine whether a predetermined condition for a fourth interference with communication involving the plurality of communication nodes is satisfied, with respect to each of the one or more low priority communication nodes, wherein the deciding unit decides the radio resource with respect to each of the one or more low priority communication nodes, on the basis of a determination result with respect to the predetermined condition.

(15)

The communication control device according to any one of (1) to (14), wherein the first interference is an interference by a downlink signal transmitted by the communication node that is not control target or an uplink signal transmitted to the communication node that is not control target, and the second interference is an interference by a downlink signal transmitted by the other communication node or an uplink signal transmitted to the other communication node.

(16)

The communication control device according to (15), wherein the interference by the uplink signal transmitted to the other communication node is an interference estimated under an assumption that a transmission node that transmits the uplink signal to the other communication node exists in a predetermined range or at a predetermined position which are closer to the communication node of control target within a communication range of the other communication node.

(17)

The communication control device according to any one of (1) to (16), wherein the communication node that is not control target includes a communication node of a primary system, and each of the plurality of communication nodes is a communication node of a secondary system that secondarily utilizes a radio resource for the primary system.

(18)

The communication control device according to any one of (1) to (16), wherein the communication node that is not control target includes a base station of a macro cell, and each of the plurality of communication nodes is a base station of a small cell that overlaps the macro cell partially or entirely.

(19)

A communication control method including:

acquiring first interference information indicating a first interference from communication involving a communication node that is not control target and second interference information indicating a second interference from communication involving another communication node of control target, with respect to each of a plurality of communication nodes of control target; and classifying the plurality of communication nodes into a plurality of groups related to a decision of a radio resource that a communication node is able to utilize, on the basis of the first interference information and the second interference information with respect to the plurality of communication nodes.

(20)

An information processing apparatus including:

a memory that stores a predetermined program; and a processor configured to execute the predetermined program, wherein the predetermined program is a program for executing acquiring first interference information indicating a first interference from communication involving a communication node that is not control target and second interference information indicating a second interference from communication involving another communication node of control target, with respect to each of a plurality of communication nodes of control target, and classifying the plurality of communication nodes into a plurality of groups related to a decision of a radio resource that a communication node is able to utilize, on the basis of the first interference information and the second interference information with respect to the plurality of communication nodes.

REFERENCE SIGNS LIST 1 communication system
10 master white space device (WSD)
11 high priority master WSD
13 low priority master WSD
15 base station (of small cell)
20 communication range
21 small cell
30 slave WSD
31 terminal device
50, 51 data base (DB)
60 transmitter station
67 base station (of macro cell)
69 macro cell
100, 101 communication control device
135, 143 interference information acquiring unit
137, 147 classifying unit
139, 149 channel deciding unit
145 interference determination unit

The invention claimed is:

1. A communication control device, comprising:
a communication interface configured to
acquire first interference information indicating a first interference from communication involving a communication node operating in a first wireless communication system that is not under control of the communication control device, and
acquire second interference information indicating a second interference from communication involving another communication node operating in a second wireless communication system under control of the communication control device, with respect to each of a plurality of communication nodes operating in the second wireless communication system under control of the communication control device, and the second wireless communication system being different than the first wireless communication system; and
circuitry configured to classify the plurality of communication nodes operating in the second wireless communication system under control the communication control device into a plurality of groups related to a decision of a radio resource of the first wireless communication system that is available for use by a communication node operating in the second wireless communication system under control of the communication control device based on the first interference information and the second interference information with respect to the plurality of communication nodes.

2. The communication control device according to claim 1, wherein the plurality of groups are a plurality of groups corresponding to an order in which the radio resource is decided.

3. The communication control device according to claim 2, wherein
the plurality of groups include at least a first group and a second group, and
a communication node classified into the first group is a communication node in which a level of the first interference relative to the second interference is larger, as compared with a communication node classified into the second group.

4. The communication control device according to claim 3, wherein the second group is a group for which the radio resource is decided after the first group.

5. The communication control device according to claim 4, wherein the circuitry is configured to:
decide the radio resource with respect to each of the plurality of communication nodes; decide the radio resource with respect to each of one or more communication nodes classified into the first group; and
decide the radio resource with respect to each of one or more communication nodes classified into the second group based on a decision result of the radio resource in the first group.

6. The communication control device according to claim 5, wherein the circuitry is configured to decide one or more radio resource candidates having a smaller level of the first interference among two or more radio resource candidates, as the radio resource for the communication node classified into the first group.

7. The communication control device according to claim 3, wherein the second group is a group for which the radio resource is decided before the first group.

8. The communication control device according to claim 7, wherein the circuitry is configured to:
decide the radio resource with respect to each of the plurality of communication nodes; decide the radio resource with respect to each of one or more communication nodes classified into the second group; and
decide the radio resource with respect to each of one or more communication nodes classified into the first group based on a decision result of the radio resource in the second group.

9. The communication control device according to claim 8, wherein the circuitry is configured to decide one or more radio resource candidates having a smaller level of a third interference with the one or more communication nodes classified into the second group among two or more radio resource candidates, as the radio resource for the communication node classified into the first group.

10. The communication control device according to claim 3, wherein the circuitry is configured to:
decide the radio resource with respect to each of the plurality of communication nodes; and
when deciding the radio resource with respect to each of the one or more communication nodes classified into the second group, decide the radio resource with respect to the communication node having a smaller level of the second interference, and decide, based on a decision result of the radio resource with respect to the communication node, the radio resource with respect to the communication node having a larger level of the second interference.

11. The communication control device according to claim 3, wherein the circuitry is configured to:
decide the radio resource with respect to each of the plurality of communication nodes; and, decide one or more radio resource candidates having a smaller level of interference including the first interference and the second interference among two or more radio resource candidates, as the radio resource for the communication node classified into the second group.

12. The communication control device according to claim 3, wherein the first interference information indicates the first interference in each of two or more radio resource candidates, the second interference information indicates the second interference in each of the two or more radio resource candidates, and the level of the first interference relative to the second interference corresponds to the number of the radio resource candidates for which a level of the first interference is larger than a level of the second interference by a predetermined threshold value or more.

13. The communication control device according to claim 1, wherein the circuitry is configured to decide the radio resource with respect to each of the plurality of communication nodes, the plurality of communication nodes are communication nodes of a higher priority than one or more low priority communication nodes under control of the communication control device, and the circuitry is configured to decide the radio resource with respect to each of the one or more low priority communication nodes based on a decision result of the radio resource with respect to the plurality of communication nodes.

14. The communication control device according to claim 13, wherein the circuitry is configured to:

determine whether a predetermined condition for a fourth interference with communication involving the plurality of communication nodes is satisfied, with respect to each of the one or more low priority communication nodes, and decide the radio resource with respect to each of the one or more low priority communication nodes based on a determination result with respect to the predetermined condition.

15. The communication control device according to claim 1, wherein the first interference is an interference by a downlink signal transmitted by the communication node operating in the first wireless communication system that is not under control of the communication control device or an uplink signal transmitted to the communication node that is not under control of the communication control device, and the second interference is an interference by a downlink signal transmitted by the other communication node operating in the second wireless communication system under control of the communication control device or an uplink signal transmitted to the other communication node operating in the second wireless communication system under control of the communication control device.

16. The communication control device according to claim 15, wherein the interference by the uplink signal transmitted to the other communication node is an interference estimated under an assumption that a transmission node that transmits the uplink signal to the other communication node exists in a predetermined range or at a predetermined position which are closer to the communication node under control of the communication control device within a communication range of the other communication node.

17. A communication control method comprising:

acquiring first interference information, by a communication control device, indicating a first interference from communication involving a communication node operating in a first wireless communication system that is not under control of the communication control device;

acquiring, by the communication control device, second interference information indicating a second interference from communication involving another communication node operating in a second wireless communication system under control of the communication control device, with respect to each of a plurality of communication nodes operating in the second wireless communication system under control of the communication control device, and the second wireless communication system being different than the first wireless communication system; and classifying, by the communication control device, the plurality of communication nodes operating in the second wireless communication system under control of the communication control device into a plurality of groups related to a decision of a radio resource of the first wireless communication system that is available for use by a communication node operating in the second wireless communication system under control of the communication control device based on the first interference information and the second interference information with respect to the plurality of communication nodes.

18. A communication control device comprising:

a communication interface configured to acquire first interference information indicating a first interference from communication involving a communication node that is not under control of the communication control device, and acquire second interference information indicating a second interference from communication involving another communication node under control of the communication control device, with respect to each of a plurality of communication nodes operating under control of the communication control device, and the second wireless communication system being different than the first wireless communication system; and circuitry configured to classify the plurality of communication nodes into a plurality of groups related to a decision of a radio resource that is available for use by a communication node under control of the communication control device based on the first interference information and the second interference information with respect to the plurality of communication nodes, wherein the circuitry is configured to decide the radio resource with respect to each of the plurality of communication nodes, the plurality of communication nodes are communication nodes of a higher priority than one or more low priority communication nodes under control of the communication control device, and the circuitry is configured to decide the radio resource with respect to each of the one or more low priority communication nodes based on a decision result of the radio resource with respect to the plurality of communication nodes.

* * * * *